(12) United States Patent
Suh et al.

(10) Patent No.: US 11,601,182 B2
(45) Date of Patent: Mar. 7, 2023

(54) METHOD OF TRANSMITTING AND RECEIVING DATA IN WIRELESS COMMUNICATION SYSTEM SUPPORTING FULL-DUPLEX RADIO AND APPARATUS THEREFOR

(71) Applicant: LG ELECTRONICS INC., Seoul (KR)

(72) Inventors: Yonghak Suh, Seoul (KR); Woochan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 49 days.

(21) Appl. No.: 17/207,509

(22) Filed: Mar. 19, 2021

(65) Prior Publication Data

US 2022/0302984 A1    Sep. 22, 2022

(51) Int. Cl.
| | |
|---|---|
| H04B 7/06 | (2006.01) |
| H04L 5/14 | (2006.01) |
| H04W 72/04 | (2023.01) |
| H04B 17/345 | (2015.01) |
| H04W 24/02 | (2009.01) |
| H04B 17/19 | (2015.01) |
| H04W 72/044 | (2023.01) |

(52) U.S. Cl.
CPC ........... *H04B 7/0695* (2013.01); *H04B 17/19* (2015.01); *H04B 17/345* (2015.01); *H04L 5/14* (2013.01); *H04W 24/02* (2013.01); *H04W 72/042* (2013.01); *H04W 72/046* (2013.01)

(58) Field of Classification Search
None
See application file for complete search history.

(56) References Cited

U.S. PATENT DOCUMENTS

| | | | |
|---|---|---|---|
| 11,510,149 B2* | 11/2022 | Park | H04W 52/42 |
| 2012/0220238 A1* | 8/2012 | Hosoya | H04B 7/06 455/63.4 |
| 2013/0072244 A1* | 3/2013 | Jeong | H04B 7/0695 455/517 |
| 2015/0382171 A1* | 12/2015 | Roy | H04Q 3/08 370/329 |
| 2016/0036510 A1* | 2/2016 | Hosoya | H04B 7/0408 375/267 |

(Continued)

*Primary Examiner* — Andrew C Oh
(74) *Attorney, Agent, or Firm* — Lee Hong Degerman Kang Waimey

(57) ABSTRACT

A method of transmitting and receiving a signal by a user equipment (UE) in a wireless communication system is disclosure. The method includes receiving information related to beam switching from a base station (BS), generating at least one transmission beam pattern based on the information related to the beam switching, transmitting a reference signal by using the at least one transmission beam pattern, measuring a self-interference signal based on the reference signal, transmitting information about the measured self-interference signal to the BS, and receiving beam pattern information based on the measured self-interference signal from the BS. The beam pattern information indicates a beam pattern determined by the BS, and the information related to the beam switching includes information about one of whether beam switching is requested, a beam switching interval, and the number of beam switching candidates.

13 Claims, 28 Drawing Sheets

(56) References Cited

U.S. PATENT DOCUMENTS

| | | | |
|---|---|---|---|
| 2017/0215117 A1* | 7/2017 | Kwon | H04W 36/32 |
| 2017/0279501 A1* | 9/2017 | Kim | H04L 5/0023 |
| 2017/0331533 A1* | 11/2017 | Strong | G01C 21/18 |
| 2018/0123648 A1* | 5/2018 | Nagaraja | H04B 7/06 |
| 2018/0343612 A1* | 11/2018 | Akula | H04W 52/0212 |
| 2019/0116012 A1* | 4/2019 | Nam | H04W 76/27 |
| 2019/0223177 A1* | 7/2019 | Yamada | H04L 5/005 |
| 2019/0230529 A1* | 7/2019 | Sadiq | H04L 5/001 |
| 2019/0306888 A1* | 10/2019 | Takeda | H04W 74/08 |
| 2019/0349872 A1* | 11/2019 | Harada | H04L 27/26 |
| 2020/0037297 A1* | 1/2020 | Pan | H04W 16/28 |
| 2020/0053661 A1* | 2/2020 | Yang | H04W 72/10 |
| 2020/0059337 A1* | 2/2020 | Yamada | H04L 27/2613 |
| 2020/0112978 A1* | 4/2020 | Zhang | H04L 5/005 |
| 2020/0358500 A1* | 11/2020 | Ryu | H04B 7/063 |
| 2020/0393532 A1* | 12/2020 | Chae | G01S 5/0273 |
| 2021/0051502 A1* | 2/2021 | Yamada | H04W 24/10 |
| 2021/0058967 A1* | 2/2021 | Oteri | H04W 72/042 |
| 2021/0084655 A1* | 3/2021 | Estevez | H04B 7/0408 |
| 2021/0307008 A1* | 9/2021 | Raghavan | H04W 72/082 |
| 2021/0329564 A1* | 10/2021 | Levy | H04W 52/242 |
| 2022/0132459 A1* | 4/2022 | Raghavan | H04W 64/003 |
| 2022/0150737 A1* | 5/2022 | Saggar | H04B 17/30 |
| 2022/0225119 A1* | 7/2022 | Li | H04B 7/18513 |

\* cited by examiner (a)

|  | measurement time | | | | | | | | |
|---|---|---|---|---|---|---|---|---|---|
|  | #0 | #1 | #2 | #3 | #4 | #5 | #6 | #7 | #8 |
| UE A | TX pattern#0 | TX pattern#1 | TX pattern#2 | RX measure #0 | RX measure #1 | RX measure #2 | RX measure #0 | RX measure #1 | RX measure #2 |
| UE B | RX measure #0 | RX measure #1 | RX measure #2 | TX pattern#0 | TX pattern#1 | TX pattern#2 | RX measure #0 | RX measure #1 | RX measure #2 |
| UE C | RX measure #0 | RX measure #1 | RX measure #2 | RX measure #0 | RX measure #1 | RX measure #2 | TX pattern#0 | TX pattern#1 | TX pattern#2 |

METHOD OF TRANSMITTING AND RECEIVING DATA IN WIRELESS COMMUNICATION SYSTEM SUPPORTING FULL-DUPLEX RADIO AND APPARATUS THEREFOR

TECHNICAL FIELD

The present disclosure relates to a method of transmitting and receiving data related to full-duplex radio (FDR) in a wireless communication system supporting FDR and an apparatus therefor.

BACKGROUND ART

A wireless communication system is a multiple access system that supports communication with multiple users by sharing available system resources (e.g., bandwidth, transmit power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Sidelink (SL) refers to a communication scheme in which a direct link is established between user equipments (UEs) and the UEs directly exchange voice or data without intervention of a base station (BS). SL is considered as one method of relieving a burden on the BS due to rapidly growing data traffic.

A UE or a vehicle may receive resources allocated for an uplink signal and resources allocated for a downlink signal from the BS. The UE or the vehicle may receive the resources allocated for the uplink signal through uplink control information (UCI) from the BS or receive the resources allocated for the downlink signal through downlink control information (DCI) from the BS.

As more and more communication devices demand larger communication capacity, there is a need for enhanced mobile broadband (eMBB) communication relative to legacy radio access technology (RAT). Accordingly, a communication system is under discussion, for which services or UEs sensitive to reliability and latency are considered. Next-generation RAT in which eMBB communication, machine type communication (MTC), and ultra-reliable and low-latency communication (URLLC) are considered may be referred to as new RAT or NR. In NR, vehicle-to-everything (V2X) communication may also be supported.

DISCLOSURE

Technical Problem

An aspect of the present disclosure is to provide a method of determining a transmission beam for a user equipment (UE) in consideration of cross-link interference (CLI) that a transmission signal from a transmitting UE causes to other UEs as well as self-interference of the transmission signal for the transmitting UE in a full duplex communication system.

It will be appreciated by persons skilled in the art that the objects that could be achieved with the various embodiments are not limited to what has been particularly described hereinabove and the above and other objects that the various embodiments could achieve will be more clearly understood from the following detailed description.

Technical Solution

According to one aspect, a method of transmitting and receiving a signal by a user equipment (UE) in a wireless communication system may include receiving information related to beam switching from a base station (BS), generating at least one transmission beam pattern based on the information related to the beam switching, transmitting a reference signal by using the at least one transmission beam pattern, measuring a self-interference signal based on the reference signal, transmitting information about the measured self-interference signal to the BS, and receiving beam pattern information based on the measured self-interference signal from the BS. The beam pattern information may indicate a beam pattern determined by the BS, and the information related to the beam switching may include information about one of whether beam switching is requested, a beam switching interval, and the number of beam switching candidates.

Alternatively, the at least one transmission beam pattern may be generated based on the beam switching interval and the number of beam switching candidates.

Alternatively, the beam pattern determined by the BS may be determined based on the information about the measured self-interference signal and information about cross-link interference (CLI) measured by another UE.

Alternatively, the UE and the other UE may be included in a first group, and the first group may include mutually affecting UEs.

Alternatively, the UE may support full duplex radio (FDR) mode.

Alternatively, based on the other UE supporting only transmission mode, the beam pattern determined by the BS may be determined based on best cancellation of the measured self-interference signal.

Alternatively, based on the other UE supporting only reception mode, the beam pattern determined by the BS may be determined in consideration of performance of the UE and performance of the other UE.

Alternatively, based on the other UE supporting the FDR mode, the beam pattern determined by the BS may be determined based on least degradation of performance of the other UE.

According to another aspect, a UE for transmitting and receiving a signal in a wireless communication system may include a transmitter, a receiver, and a processor. The receiver may be configured to receive information related to beam switching from a BS, the processor may be configured to generate at least one transmission beam pattern based on the information related to the beam switching, the transmitter may be configured to transmit a reference signal by using the at least one transmission beam pattern, the processor may be configured to measure self-interference signal based on the reference signal, the transmitter may be configured to transmit information about the measured self-interference signal to the BS, and the receiver may be configured to receive beam pattern information based on the measured self-interference signal from the BS. The beam pattern information may indicate a beam pattern determined by the BS, and the information related to the beam switching may include information about one of whether beam switching is requested, a beam switching interval, and the number of beam switching candidates.

According to another aspect, a method of transmitting and receiving a signal by a BS in a wireless communication system may include transmitting, to a UE, information related to beam switching, receiving, from the UE, a reference signal by using at least one transmission beam pattern of the UE, receiving, from the UE, information about self-interference signal measured by the UE, determining a beam pattern based on the measured self-interference signal, and transmitting, to the UE, beam pattern information about the determined beam pattern. The at least one transmission beam pattern may be generated based on the information about the beam switching, and the information related to the beam switching may include information about one of whether beam switching is requested, a beam switching interval, and the number of beam switching candidates.

According to another aspect, a BS for transmitting and receiving a signal in a wireless communication system may include a transmitter, a receiver, and a processor. The transmitter may be configured to transmit, to a UE, information related to beam switching, the receiver may be configured to receive, from the UE, a reference signal by using at least one transmission beam pattern of the UE and receive, from the UE, information about self-interference signal measured by the UE, the processor may be configured to determine a beam pattern based on the measured self-interference signal, and the transmitter may be configured to transmit, to the UE, beam pattern information about the determined beam pattern. The at least one transmission beam pattern may be generated based on the information about the beam switching, and the information related to the beam switching may include information about one of whether beam switching is requested, a beam switching interval, and the number of beam switching candidates.

According to another aspect, an apparatus for a UE may include at least one processor, and at least one computer memory operatively coupled to the at least one processor and storing instructions which when executed, cause the at least one processor to perform operations. The operations may include receiving information related to beam switching from a BS, generating at least one transmission beam pattern based on the information related to the beam switching, transmitting a reference signal by using the at least one transmission beam pattern, measuring a self-interference signal based on the reference signal, transmitting information about the measured self-interference signal to the BS, and receiving beam pattern information based on the measured self-interference signal from the BS. The beam pattern information may indicate a beam pattern determined by the BS, and the information related to the beam switching may include information about one of whether beam switching is requested, a beam switching interval, and the number of beam switching candidates.

According to another aspect, a computer-readable storage medium storing at least one computer program may include instructions which when executed by the at least one processor, cause the at least one processor to perform operations. The operations may comprise receiving information related to beam switching from a BS, generating at least one transmission beam pattern based on the information related to the beam switching, transmitting a reference signal by using the at least one transmission beam pattern, measuring a self-interference signal based on the reference signal, transmitting information about the measured self-interference signal to the BS, and receiving beam pattern information based on the measured self-interference signal from the BS. The beam pattern information may indicate a beam pattern determined by the BS, and the information related to the beam switching may include information about one of whether beam switching is requested, a beam switching interval, and the number of beam switching candidates.

Advantageous Effects

According to the present disclosure, because an optimal beam pattern is indicated to a user equipment (UE) in consideration of both self-interference (SI) and cross-link interference (CLI) in a full duplex radio (FDR) communication system, system performance may be increased.

The objects to be achieved are not limited to what has been particularly described hereinabove and other objects not described herein will be more clearly understood by persons skilled in the art from the following detailed description.

BRIEF DESCRIPTION OF THE DRAWINGS

The accompanying drawings, which are included to provide a further understanding of the present disclosure, illustrate various implementation examples of the present disclosure and together with the description serve to explain the principle of the present disclosure. In the drawings:

FIG. 19 is a diagram illustrating time division for enabling each UE to transmit a signal while switching beam patterns and measure signals received from other UEs according to the present disclosure;

BEST MODE

Figure 1:
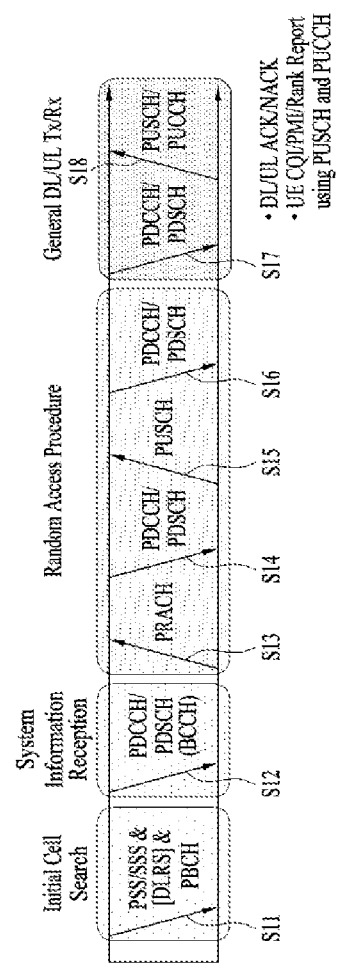
FIG. 1 is a diagram illustrating physical channels used in various embodiments of the present disclosure and a signal transmission method using the same.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details. For example, while the following detailed description is given under the assumption that a mobile communication system is a 3GPP LTE or LTE-A system, the mobile communication system is applicable to other arbitrary mobile communication systems except for matters that are specific to the 3GPP LTE or LTE-A system. In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

In the following description, downlink (DL) refers to communication from a base station (BS) to a user equipment (UE), and uplink (UL) refers to communication from the UE to the BS. On DL, a transmitter may be a part of the BS and a receiver may be a part of the UE. On UL, the transmitter may be a part of the UE and the receiver may be a part of the BS. In the present disclosure, the BS may be represented as a first communication device and the UE may be represented as a second communication device. The BS may be replaced with the term "fixed station", "Node B", "evolved-Node B (eNB)", "next generation Node B (gNB)", "base transceiver system (BTS)", "access point (AP)", "network or 5G network node", "AI system", "roadside unit (RSU)", or "robot". The UE may be replaced with the term "terminal", "mobile station (MS)", "user terminal (UT)", "mobile subscriber station (MSS)", "subscriber station (SS)", "advanced mobile station (AMS)", "wireless terminal (WT)", "machine-type communication (MTC) device", "machine-to-machine (M2M) device", "device-to-device (D2D) device", "vehicle", "robot", or "AI module".

Technology described below may be used in various radio access systems such as a code division multiple access (CDMA) system, a frequency division multiple access (FDMA) system, a time division multiple access (TDMA) system, an orthogonal frequency division multiple access (OFDMA) system, and a single-carrier frequency division multiple access (SC-FDMA) system. CDMA may be implemented by radio technology such as universal terrestrial radio access (UTRA) or CDMA2000. TDMA may be implemented by radio technology such as global system for mobile communications (GSM), general packet radio service (GPRS), or enhanced data rates for GSM evolution (EDGE). OFDMA may be implemented by radio technology such as institute of electrical and electronics engineers (IEEE) 802.11 (Wi-Fi), IEEE 802.16 (WiMAX), IEEE 802.20, or evolved-UTRA (E-UTRA). UTRA is part of universal mobile telecommunications system (UMTS). 3rd generation partnership project (3GPP) long-term evolution (LTE) is part of evolved UMTS (E-UMTS) using E-UTRA and LTE-advanced (LTE-A)/LTE-A pro is an evolved version of 3GPP LTE. 3GPP new radio or new radio access technology (3GPP NR) is an evolved version of 3GPP LTE/LTE-A pro.

For clarity, a description is given based on a 3GPP communication system (e.g., LTE-A or NR) but the scope of the present disclosure is not limited thereto. LTE refers to technology beyond 3GPP TS 36.xxx Release 8. More specifically, LTE technology beyond 3GPP TS 36.xxx Release 10 is referred to as LTE-A, and LTE technology beyond 3GPP TS 36.xxx Release 13 is referred to as LTE-A pro. 3GPP NR refers to technology beyond TS 38.xxx Release 15. LTE/NR may be referred to as a 3GPP system. "xxx" represents a detailed number of a technical specification. LTE/NR may be collectively referred to as a 3GPP system.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, or repeater may be the node. Furthermore, the node may not be the BS. For example, a radio remote head (RRH) or a radio remote unit (RRU) may be the node. Generally, the RRH or RRU has a power level lower than that of the BS. At least one antenna is installed per node. The antenna may refer to a physical antenna or refer to an antenna port, a virtual antenna, or an antenna group. The node may also be called a point.

In the present disclosure, a cell refers to a specific geographical area or a radio resource in or on which one or more nodes provide communication services. The "cell" of the geographic area may be understood as coverage within which a node may provide services using a carrier, and the "cell" of the radio resources is associated with bandwidth, which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of a radio resource used by the node. Accordingly, the term "cell" may be used to indicate service coverage by the node sometimes, the radio resource at other times, or a range within which a signal using the radio resource may reach with valid strength at other times.

In the present disclosure, communicating with a specific cell may mean communicating with a BS or a node that provides communication services to the specific cell. A DL/UL signal of the specific cell refers to a DL/UL signal from/to the BS or the node that provides communication services to the specific cell. A cell that provides UL/DL communication services to a UE is especially called a serving cell. Furthermore, channel status/quality of the specific cell refers to status/quality of a channel or a communication link formed between the BS or the node that provides communication services to the specific cell and the UE.

The "cell" associated with the radio resource may be defined by a combination of DL resources and UL resources, i.e., a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information transmitted through a corresponding cell. In this case, the carrier frequency may be equal to or different from a center frequency of each cell or CC. Hereinbelow, a cell operating on a primary frequency will be referred to as a primary cell (Pcell) or a primary CC (PCC), and a cell operating on a secondary frequency will be referred to as a secondary cell (Scell) or a secondary CC (SCC). The Scell may be configured after a UE and a BS perform a radio resource control (RRC) connection establishment procedure and thus RRC connection is established between the UE and the BS, i.e., after the UE is in an RRC-CONNECTED state. RRC connection may mean a path through which RRC of the UE may exchange messages with RRC of the BS. The Scell may be configured to provide additional radio resources to the UE. The Scell and the Pcell may form a set of serving cells for the UE according to capabilities of the UE. Only one serving cell configured with the Pcell exists for an RRC_CONNECTED UE which is not configured with carrier aggregation or does not support carrier aggregation.

A cell supports a unique RAT. For example, LTE RAT-based transmission/reception is performed in an LTE cell, and 5G RAT-based transmission/reception is performed in a 5G cell.

Carrier aggregation (CA) aggregates a plurality of carriers each having a narrower system bandwidth than a target bandwidth to support broadband. CA differs from OFDMA in that DL or UL communication is performed using a plurality of carrier frequencies each forming a system bandwidth (or channel bandwidth) in the former, and DL or UL communication is performed by carrying a basic frequency band divided into a plurality of orthogonal subcarriers in one carrier frequency in the latter. In OFDMA or orthogonal frequency division multiplexing (OFDM), for example, one frequency band having a certain system bandwidth is divided into a plurality of subcarriers with a predetermined subcarrier spacing, information/data is mapped to the plurality of subcarriers, and the frequency band in which the information/data has been mapped is transmitted in a carrier frequency of the frequency band through frequency upconversion. In wireless CA, frequency bands each having a system bandwidth and a carrier frequency may be used simultaneously used for communication, and each frequency band used in CA may be divided into a plurality of subcarriers with a predetermined subcarrier spacing.

The 3GPP-based communication standards define DL physical channels corresponding to resource elements (REs) carrying information originated from upper layers of a physical layer (e.g., a medium access control (MAC) layer, a radio link control (RLC) layer, a packet data convergence protocol (PDCP) layer, an RRC layer, a service data adaptation protocol (SDAP) layer, and a non-access stratum (NAS) layer), and DL physical signals corresponding to REs which are used in the physical layer but do not deliver information originated from the upper layers. For example, a physical downlink shared channel (PDSCH), a physical broadcast channel (PBCH), a physical multicast channel (PMCH), a physical control format indicator channel (PCFICH), and a physical downlink control channel (PDCCH) are defined as the DL physical channels, and a reference signal (RS) and a synchronization signal are defined as the DL physical signals. The RS, also called a pilot, means a signal of a predefined special waveform known to both a BS and a UE. For example, a cell-specific RS (CRS), a UE-specific RS (UE-RS), a positioning RS (PRS), a channel state information RS (CSI-RS), and a demodulation RS (DMRS) are defined as DL RSs. The 3GPP-based communication standards also define UL physical channels corresponding to REs carrying information originating from upper layers, and UL physical signals corresponding to REs which are used in the physical layer but do not carry information originating from the upper layers. For example, a physical uplink shared channel (PUSCH), a physical uplink control channel (PUCCH), and a physical random access channel (PRACH) are defined as the UL physical channels, and a DMRS for a UL control/data signal and a sounding reference signal (SRS) used for UL channel measurement are defined for the UL physical signals.

In the present disclosure, the PDCCH and the PDSCH may refer to a set of time-frequency resources or REs that carry downlink control information (DCI) and DL data, respectively. The PUCCH, PUSCH, and PRACH refer to a set of time-frequency resources or REs that carry uplink control information (UCI), UL data, and random access signals, respectively. In the following description, "the UE transmits a UL physical channel (e.g., a PUCCH, PUSCH, or PRACH)" may mean that the UE transmits the UCI, UL data, or random access signals on or through the UL physical channel, and "the BS receives a UL physical channel" may mean that the BS receives the UCI, UL data, or random access signal on or through the UL physical channel. "The BS transmits a DL physical channel (e.g., a PDCCH or PDSCH)" may mean that the BS transmits the DCI or DL data on or through the DL physical channel, and "the UE receives a DL physical channel" may mean that the UE receives the DCI or DL data on or through the DL physical channel.

In the present disclosure, a transport block (TB) is payload for a physical layer. For example, data provided to the physical layer by an upper layer or a MAC layer is basically referred to as a TB.

In the present disclosure, hybrid automatic repeat and request (HARQ) is a kind of error control technique. HARQ acknowledgement (HARQ-ACK) transmitted on DL is used for error control of UL data, and HARQ-ACK transmitted on UL is used for error control of DL data. A transmitter performing a HARQ operation awaits reception of ACK after transmitting data (e.g., a TB or a codeword). A receiver performing a HARQ operation transmits ACK only when data has been successfully received and transmits negative ACK (NACK) when the received data has an error. Upon receipt of ACK, the transmitter may transmit (new) data, and upon receipt of NACK, the transmitter may retransmit the data. Time delay occurs until a BS receives ACK/NACK from a UE and transmits retransmission data after transmitting scheduling information and data according to the scheduling information. The time delay is generated due to channel propagation delay or time consumed for data decoding/encoding. Accordingly, if new data is transmitted after a HARQ process which is currently in progress is ended, a gap in data transmission occurs due to time delay. In order to prevent the gap in data transmission from occurring during a time delay duration, a plurality of independent HARQ processes is used. For example, when there are 7 transmission occasions between initial transmission and retransmission, a communication device may perform 7 independent HARQ processes to transmit data without any gap. A plurality of parallel HARQ processes enables successive UL/DL transmission while the device awaits HARQ feedback for previous UL/DL transmission.

In the present disclosure, CSI generically refers to information representing the quality of a radio channel (or link) established between a UE and an antenna port. The CSI may include at least one of a channel quality indicator (CQI), a precoding matrix indicator (PMI), a CSI-RS resource indicator (CRI), a synchronization signal block resource indicator (SSBRI), a layer indicator (LI), a rank indicator (RI), or a reference signal received power (RSRP).

For the background technology, terminology, and abbreviations used in the present disclosure, reference may be made to standard specifications published before the present disclosure. For example, reference may be made to the following disclosures.

3GPP LTE
3GPP TS 36.211: Physical channels and modulation
3GPP TS 36.212: Multiplexing and channel coding
3GPP TS 36.213: Physical layer procedures
3GPP TS 36.214: Physical layer; Measurements
3GPP TS 36.300: Overall description
3GPP TS 36.304: User Equipment (UE) procedures in idle mode
3GPP TS 36.314: Layer 2—Measurements
3GPP TS 36.321: Medium Access Control (MAC) protocol
3GPP TS 36.322: Radio Link Control (RLC) protocol
3GPP TS 36.323: Packet Data Convergence Protocol (PDCP)
3GPP TS 36.331: Radio Resource Control (RRC) protocol
3GPP TS 23.303: Proximity-based services (Prose); Stage 2
3GPP TS 23.285: Architecture enhancements for V2X services
3GPP TS 23.401: General Packet Radio Service (GPRS) enhancements for Evolved Universal Terrestrial Radio Access Network (E-UTRAN) access
3GPP TS 23.402: Architecture enhancements for non-3GPP accesses
3GPP TS 23.286: Application layer support for V2X services; Functional architecture and information flows
3GPP TS 24.301: Non-Access-Stratum (NAS) protocol for Evolved Packet System (EPS); Stage 3
3GPP TS 24.302: Access to the 3GPP Evolved Packet Core (EPC) via non-3GPP access networks; Stage 3
3GPP TS 24.334: Proximity-services (ProSe) User Equipment (UE) to ProSe function protocol aspects; Stage 3
3GPP TS 24.386: User Equipment (UE) to V2X control function; protocol aspects; Stage 3
3GPP NR
3GPP TS 38.211: Physical channels and modulation
3GPP TS 38.212: Multiplexing and channel coding
3GPP TS 38.213: Physical layer procedures for control
3GPP TS 38.214: Physical layer procedures for data
3GPP TS 38.215: Physical layer measurements
3GPP TS 38.300: NR and NG-RAN Overall Description
3GPP TS 38.304: User Equipment (UE) procedures in idle mode and in RRC inactive state
3GPP TS 38.321: Medium Access Control (MAC) protocol
3GPP TS 38.322: Radio Link Control (RLC) protocol
3GPP TS 38.323: Packet Data Convergence Protocol (PDCP)
3GPP TS 38.331: Radio Resource Control (RRC) protocol
3GPP TS 37.324: Service Data Adaptation Protocol (SDAP)
3GPP TS 37.340: Multi-connectivity; Overall description
3GPP TS 23.287: Application layer support for V2X services; Functional architecture and information flows
3GPP TS 23.501: System Architecture for the 5G System
3GPP TS 23.502: Procedures for the 5G System
3GPP TS 23.503: Policy and Charging Control Framework for the 5G System; Stage 2
3GPP TS 24.501: Non-Access-Stratum (NAS) protocol for 5G System (5GS); Stage 3
3GPP TS 24.502: Access to the 3GPP 5G Core Network (SGCN) via non-3GPP access networks
3GPP TS 24.526: User Equipment (UE) policies for 5G System (5GS); Stage 3

Overview of 3GPP System

Physical Channels and General Signal Transmission

In a radio access system, a UE receives information from a BS on DL and transmits information to the BS on UL. Information transmitted and received by the BS and the UE includes general data information and various control information, and various physical channels exist according to the type/usage of the information transmitted and received by the BS and the UE.

FIG. 1 is a diagram illustrating physical channels used in various embodiments of the present disclosure and a signal transmission method using the same.

When a UE is powered on again from a power-off state or enters a new cell, the UE performs an initial cell search procedure, such as acquisition of synchronization to a BS (S11). To this end, the UE establishes synchronization with the BS by receiving a primary synchronization channel (P-SCH) and a secondary synchronization channel (S-SCH) from the BS and acquires information such as a cell identity (ID).

Then the UE may acquire information broadcast in a cell by receiving a PBCH signal from the BS.

In the initial cell search procedure, the UE may monitor a DL channel status by receiving a DL RS.

Upon completion of the initial cell search procedure, the UE may acquire more detailed system information by receiving a PDCCH and a PDSCH according to information carried on the PDCCH (S12).

Next, the UE may perform a random access procedure in order to complete access to the BS (S13 to S16). To this end, the UE may transmit a preamble through a PRACH (S13) and receive a random access response (RAR) to the preamble through the PDCCH and the PDSCH corresponding to the PDCCH (S14). The UE may transmit a PUSCH using scheduling information in the RAR (S15) and perform a contention resolution procedure such as reception of a PDCCH signal and reception of a PDSCH signal corresponding to the PDCCH signal (S16).

Meanwhile, the random access procedure is performed in two steps, S13 and S15 may be performed as one operation in which the UE performs transmission, and S14 and S16 may be performed as one operation in which the BS performs transmission.

The UE that has performed the above-described procedure may receive a PDCCH signal and/or a PDSCH signal (S17) and/or transmit a PUSCH signal and/or a PUCCH signal (S18), as a general UL/DL signal transmission procedure.

Control information that the UE transmits to the BS is collectively referred to as UCI. The UCI includes HARQ-ACK/NACK, scheduling request (SR), CQI, PMI, and RI information.

Generally, the UCI is periodically transmitted through the PUCCH. However, when control information and data should be simultaneously transmitted, the UCI may be transmitted through the PUSCH. In addition, the UE may aperiodically transmit the UCI through the PUSCH according to the request/indication of a network.

New Radio Access Technology (NR)

As more and more communication devices demand larger communication capacity, there is a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, mMTC, ultra-reliable and low-latency communication (URLLC), and the like. In the present disclosure, such technology is referred to as NR. NR is an expression representing an example of fifth-generation (5G) RAT.

A new RAT system including NR uses an OFDM transmission scheme or a transmission scheme similar thereto. The new RAT system may follow OFDM parameters different from OFDM parameters of LTE. Alternatively, the new RAT system may follow numerology of legacy LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in the frequency domain. Different numerologies may be defined by scaling a reference subcarrier spacing to an integer N.

Figure 2:
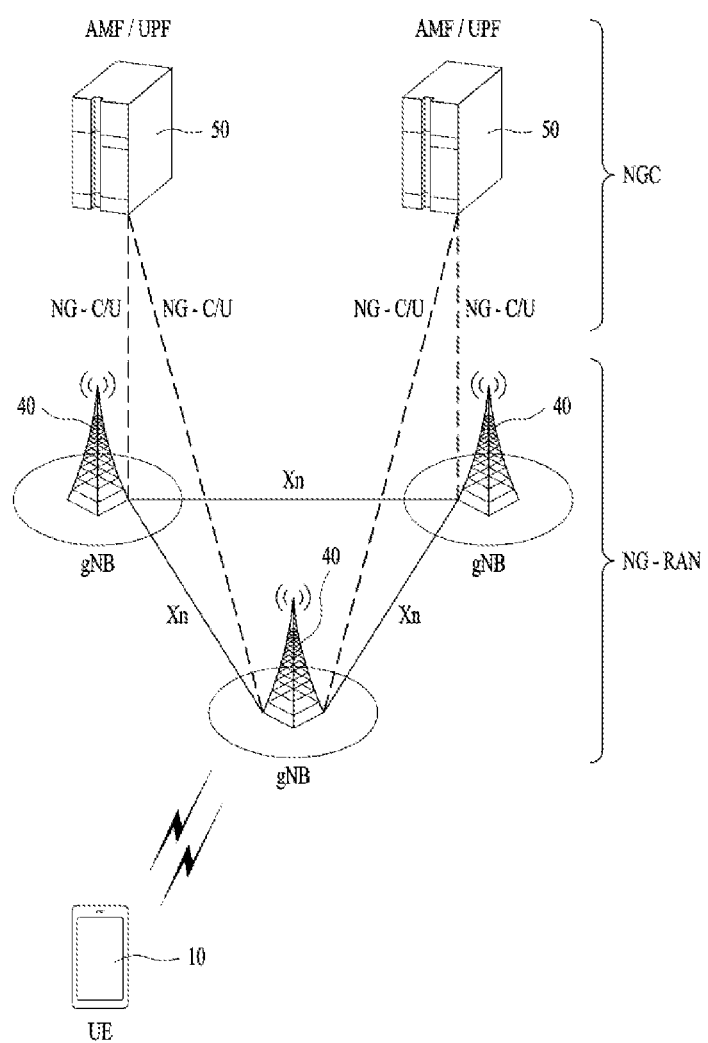
FIG. 2 illustrates the structure of a new radio (NR) system.

FIG. 2 illustrates the structure of an NR system.

Referring to FIG. 2, a next-generation radio access network (NG-RAN) may include a gNB and/or an eNB that provides a UE with user plane and control plane protocol termination points. FIG. 2 shows that the NG-RAN includes only the gNB. The gNB and the eNB are connected to each other by means of an Xn interface. The gNB and the eNB are also connected to a 5G core network (5GC) by means of an NG interface. More specifically, the gNB and the eNB are connected to an access and mobility management function (AMF) by means of an NG-C interface and to a user plane function (UPF) by means of an NG-U interface.

Figure 3:
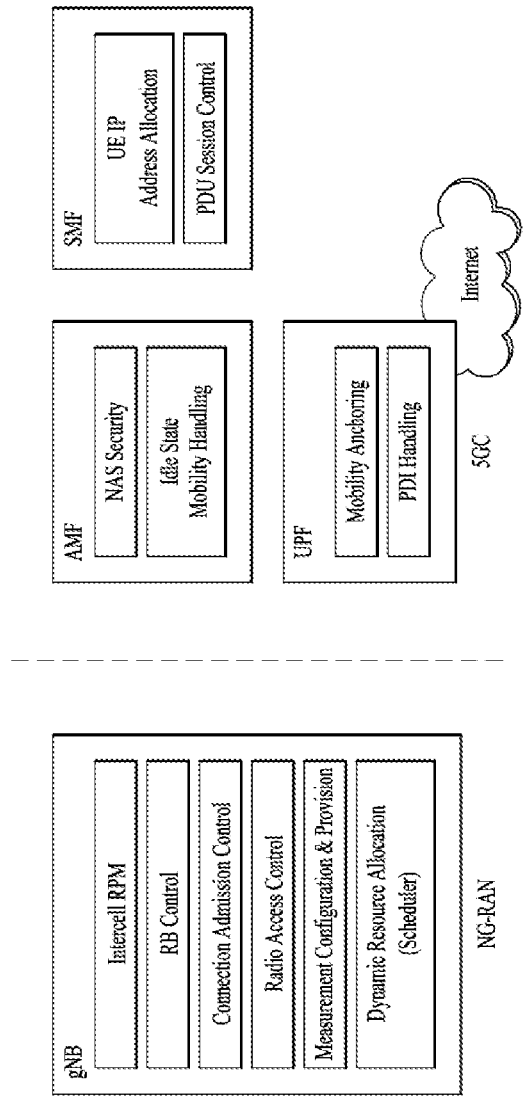
FIG. 3 illustrates functional split between a next-generation radio access network (NG-RAN) and a $5^{th}$ generation core network (5GC)

FIG. 3 illustrates functional split between an NG-RAN and a 5GC.

Referring to FIG. 3, a gNB may provide functions, such as intercell radio resource management (RRM), radio bearer control, connection mobility control, radio admission control, measurement configuration and provision, dynamic resource allocation, etc. An AMF may provide functions, such as NAS security, idle state mobility handling, etc. A UPF may provide functions, such as mobility anchoring, protocol data unit (PDU) handling, etc. A session management function (SMF) may provide functions, such as UE IP address allocation, PDU session control, etc.

Figure 4:
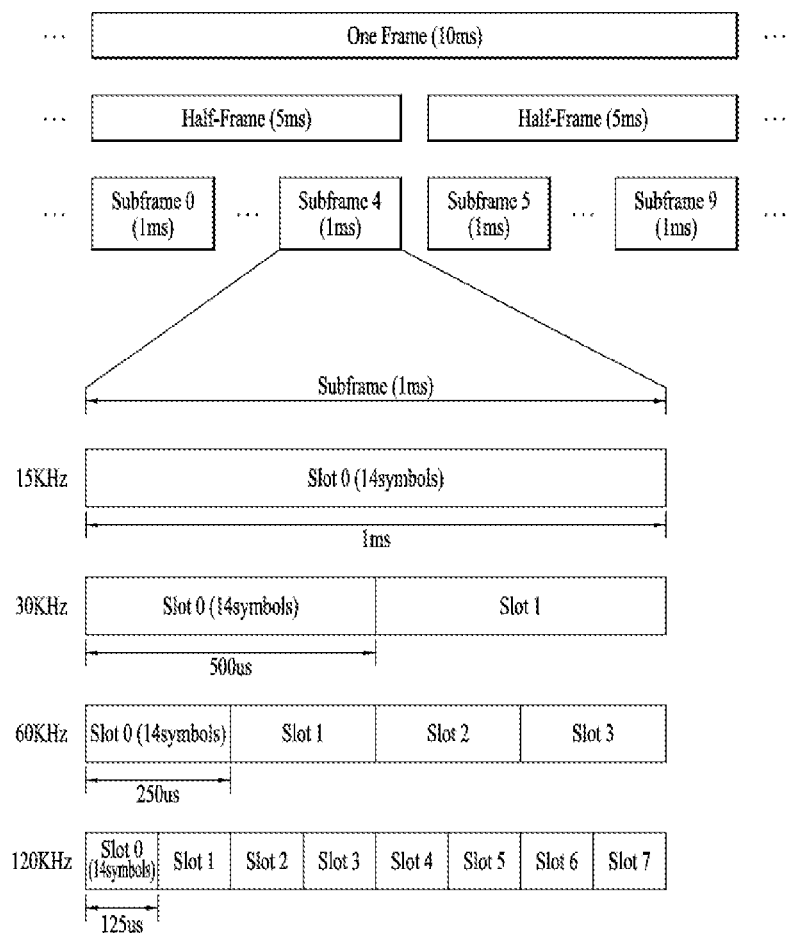
FIG. 4 illustrates the structure of an NR radio frame.

FIG. 4 illustrates the structure of an NR radio frame.

Referring to FIG. 4, a radio frame may be used for UL and DL transmission in NR. The radio frame is 10 ms long and may be defined as two half-frames (HFs), each 5 ms long. An HF may include 5 subframes (SFs), each 1 ms long. An SF may be split into one or more slots. The number of slots in the SF may be determined based on a subcarrier spacing (SCS). Each slot may include 12 or 14 OFDM(A) symbols depending on a cyclic prefix (CP).

When a normal CP is used, each slot may include 14 0symbols. When an extended CP is used, each slot may include 12 symbols. Here, a symbol may include an OFDM symbol (or CP-time resource duration) or an SC-FDMA symbol (or discrete Fourier transform-spread-OFDM (DFT-s-OFDM) symbol).

Table 1 below shows the number of symbols per slot, $N^{slot}_{symb}$, the number of slots per frame, $N^{frame,u}_{slot}$, and the number of slots per subframe, $N^{subframe,u}_{slot}$ according to SCS configuration u when the normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows the number of symbols per slot, the number of slots per frame, and the number of slots per subframe according to SCS when the extended CP is used.

TABLE 2

| SCS (15*2u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, different OFDM(A) numerologies (e.g., SCSs and CP lengths) may be configured between a plurality of cells aggregated for one UE. Then, an (absolute time) duration of a time resource (e.g., a subframe, a slot, or a transmission time interval (TTI)) consisting of the same number of symbols (for convenience, referred to as a time unit (TU)) may be differently configured between the aggregated cells.

NR supports a plurality of numerologies or SCSs to support various 5G services. For example, when an SCS is 15 kHz, a wide area in traditional cellular bands may be supported. When the SCS is 30 kHz or 60 kHz, a dense-urban, lower latency, and wider carrier bandwidth may be supported. When the SCS is 60 kHz or higher, bandwidth greater than 24.25 kHz may be supported in order to overcome phase noise.

An NR frequency band defines two types of frequency ranges. The two types of frequency ranges may be FR1 and FR2. The frequency ranges may vary in number. For example, the two types of frequency ranges are shown in Table 3 below. Among the frequency ranges used in the NR system, FR1 may represent refer to "sub-6 GHz range", and FR2 may represent "above 6 GHz range" and may be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the frequency ranges of the NR system may vary in number. For example, FR1 may include a band of 410 MHz to 7125 MHz as shown in Table 4 below. That is, FR1 may include a frequency band above 6 GHz (or 5850, 5900, 5925 MHz, etc.). For example, a frequency band above 6 GHz (or 5850, 5900, 5925 MHz, etc.) included in FR1 may include an unlicensed band. The unlicensed band may be used for various purposes, for example, communication for a vehicle (e.g., a self-driving vehicle).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 5:
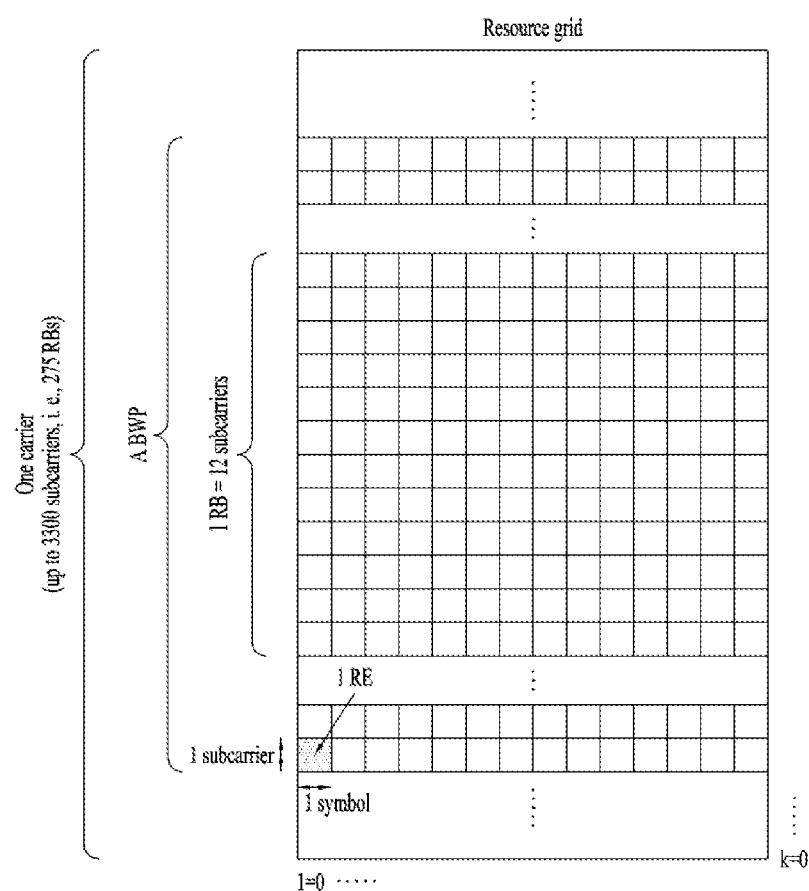
FIG. 5 illustrates a slot structure of an NR frame.

FIG. 5 illustrates a slot structure of an NR frame.

Referring to FIG. 5, a slot includes a plurality of symbols in the time domain. For example, one slot may include 14 symbols for a normal CP, whereas one slot may include 12 symbols for an extended CP. Alternatively, one slot may include 7 symbols for the normal CP, whereas one slot may include 6 symbols for the extended CP.

A carrier includes a plurality of subcarriers in the frequency domain. A resource block (RB) may be defined as multiple (e.g., 12) contiguous subcarriers in the frequency domain. A bandwidth part (BWP) may be defined as a plurality of contiguous (physical) resource blocks ((P)RBs) in the frequency domain and may correspond one numerology (e.g., SCS or CP length). The carrier may include a maximum of N (e.g., 5) BWPs. Data communication may be performed through an activated BWP. Each element may be referred to as an RE in a resource grid, and one complex symbol may be mapped to the RE.

Meanwhile, a radio interface between UEs or a radio interface between a UE and a network may consist of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
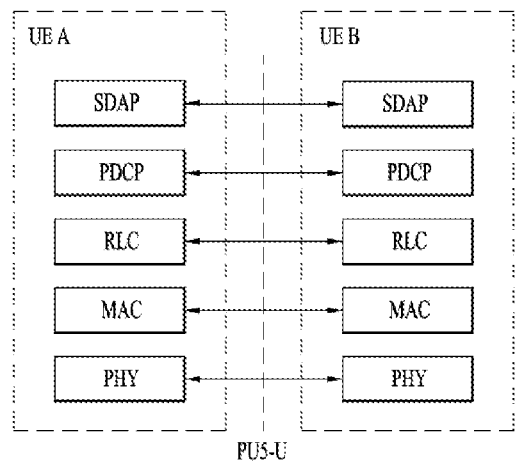
FIG. 6 illustrates a radio protocol architecture for sidelink (SL) communication.
Figure 6:
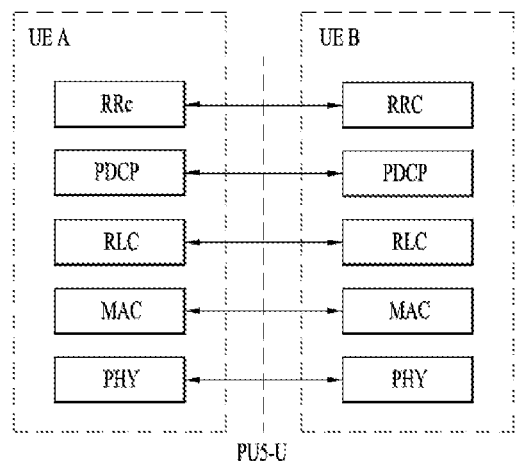

FIG. 6 illustrates a radio protocol architecture for SL communication. Specifically, FIG. 6A illustrates a user plane protocol stack of NR and FIG. 6B illustrates a control plane protocol stack of NR.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which should be first known by the UE before SL signal transmission and reception. For example, the default information may be information related to an SLSS, a duplex mode (DM), a time division duplex (TDD) UL/DL configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured SL BWP. For example, the S-SSB may have a BW of 11 RBs. For example, the PSBCH may exist across 11 RBs. In addition, a frequency position of the S-SSB may be (pre-)configured. Accordingly, the UE does not have to perform hypothesis detection in frequencies to discover the S-SSB in the carrier.

In the NR SL system, a plurality of numerologies including different SCSs and/or CP lengths may be supported. As an SCS increases, the length of a time resource for S-SSB transmission of a transmitting UE may be shortened. Then, coverage of the S-SSB may be reduced. Accordingly, in order to ensure coverage of the S-SSB, the transmitting UE may transmit one or more S-SSBs to a receiving terminal within one S-SSB transmission period according to the SCS. For example, the number of S-SSBs that the transmitting terminal transmits to the receiving terminal within one S-SSB transmission period may be pre-configured or configured for the transmitting UE. For example, the S-SSB transmission period may be 160 ms. For example, for all SCSs, an S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16, or 32 S-SSBs to the receiving UE within one S-SSB transmission period. For example, when the SCS is 120 kHz in FR2, the transmitting UE may transmit 1, 2, 4, 8, 16, 32, or 64 S-SSBs to the receiving UE within one S-SSB transmission period.

When the SCS is 60 kHz, two types of CPs may be supported. Further, the structure of an S-SSB transmitted by the transmitting UE to the receiving UE may be different according to a CP type. For example, the CP type may be a normal CP (NCP) or an extended CP (ECP). More specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol of the S-SSB transmitted by the transmitting UE. For example, upon receipt of the S-SSB, the receiving UE may perform an automatic gain control (AGC) operation in the first symbol period of the S-SSB.

Figure 7:
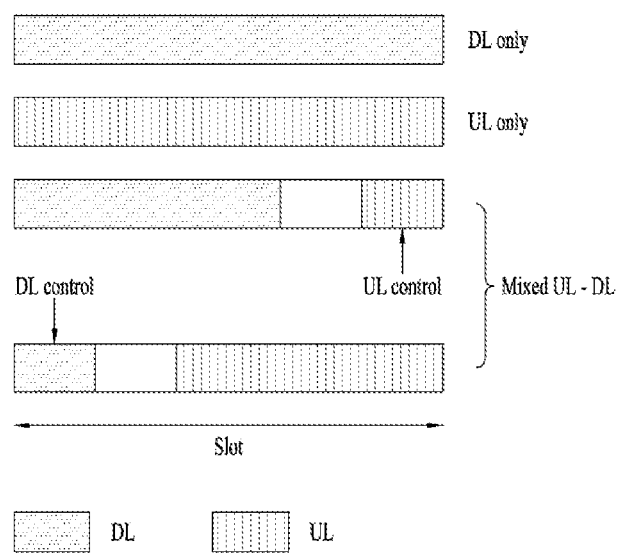
FIG. 7 illustrates the structure of a self-contained slot.

FIG. 7 illustrates the structure of a self-contained slot.

In the NR system, a frame is characterized by a self-contained structure in which all of a DL control channel, DL or UL data, and a UL control channel may be included in one slot. For example, the first N symbols (referred to as a DL control region) of a slot may be used to carry the DL control channel, and the last M symbols (referred to as a UL control region) of the slot may be used to carry the UL control channel. Each of N and M is an integer equal to or greater than 0. A resource area (referred to as a data region) between the DL control region and the UL control region may be used for DL data transmission or UL data transmission. For example, the following configurations may be considered. Each period is arranged in time order.

1. DL only configuration
2. UL only configuration
3. Mixed UL-DL configuration
   DL region+guard period (GP)+UL control region
   DL control region+GP+UL region
   DL region: (i) DL data region, (ii) DL control region+DL data region
   UL region: (i) UL data region, (ii) UL data region+UL control region A PDCCH may be transmitted in the DL control region, and a PDSCH may be transmitted in the DL data region. A PUCCH may be transmitted in the UL control region, and a PUSCH may be transmitted in the UL data region. The PDCCH may deliver DCI, for example, DL data scheduling information and UL data scheduling information. The PUCCH may deliver UCI, for example, ACK/NACK information for DL data, CSI, and an SR. The GP provides a time gap during which a BS and a UE transition from a transmission mode to a reception mode or from the reception mode to the transmission mode. Some symbols at the time of DL-to-UL switching in a subframe may be configured as the GP.

In the present disclosure, the BS may be, for example, a gNodeB.

Analog Beamforming

As a wavelength becomes short in mmW, it is possible to install a plurality of antenna elements in the same area. For example, a total of 100 antenna elements may be installed at (wavelength) intervals of 0.5 lambda in a 30-GHz band in a two-dimensional (2D) array on a panel of 5 by 5 cm. Therefore, it is considered to increase coverage or throughput by increasing beamforming (BF) gain through use of a plurality of antenna elements in mmW.

In this case, each antenna element may include a transceiver unit (TXRU) to enable adjustment of transmit power and phase per antenna element. Thereby, each antenna element may perform independent BF per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective BF is difficult because only one beam direction is generated over the full band.

To solve this problem, as an intermediate form of digital BF and analog BF, hybrid BF with B TXRUs that are fewer than Q antenna elements may be considered. In the case of the hybrid BF, the number of beam directions that may be transmitted at the same time may be limited to B or less, which depends on how B TXRUs and Q antenna elements are connected.

Figure 8:
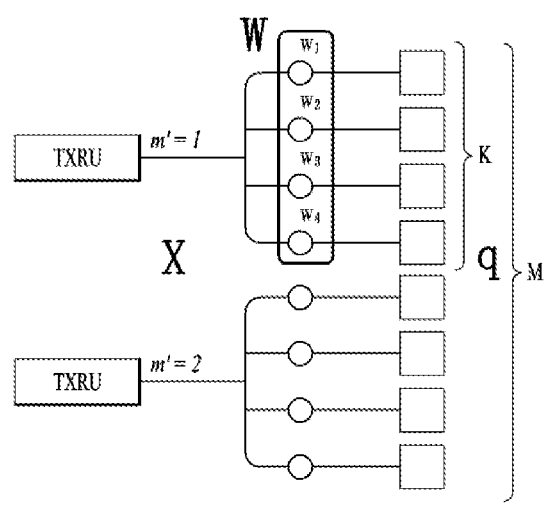
FIGS. 8 and 9 are diagrams illustrating representative methods of connecting transceiver units (TXRUs) to antenna elements.
Figure 9:
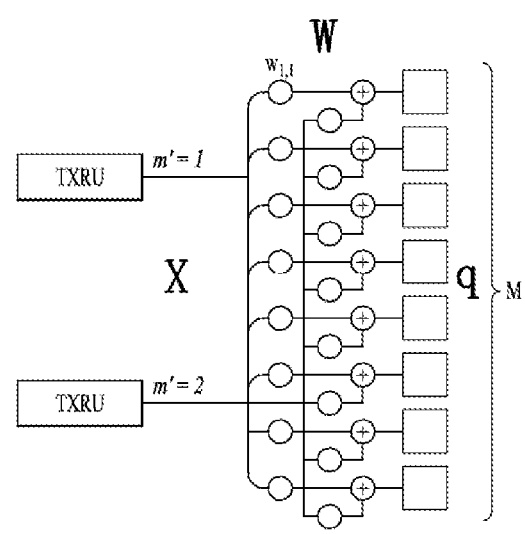

FIGS. 8 and 9 are diagrams illustrating representative methods of connecting TXRUs to antenna elements. Here, a TXRU virtualization model represents the relationship between TXRU output signals and antenna element output signals.

FIG. 8 illustrates a method of connecting TXRUs to sub-arrays. In FIG. 8, an antenna element is connected to only one TXRU.

Meanwhile, FIG. 9 illustrates a method of connecting a TXRU to all antenna elements. In FIG. 9, all antenna elements are connected to all TXRUs. In this case, separate adders are required to connect all antenna elements to all TXRUs as illustrated in FIG. 9.

In FIGS. 8 and 9, W indicates a phase vector weighted by an analog phase shifter. That is, W is a main parameter determining the direction of analog BF. In this case, the mapping relationship between CSI-RS antenna ports and TXRUs may be 1:1 or 1-to-many.

The configuration illustrated in FIG. 8 has a disadvantage in that it is difficult to achieve BF focusing but has an advantage in that all antennas may be configured at low cost.

The configuration illustrated in FIG. 9 is advantageous in that BF focusing is easily achieved. However, since all antenna elements are connected to the TXRU, the configuration has a disadvantage of increase in cost.

When a plurality of antennas is used in the NR system to which the present disclosure is applicable, the hybrid BF method obtained by combining digital BF and analog BF may be applied. In this case, analog (or radio frequency (RF)) BF means an operation in which precoding (or combining) is performed at an RF end. In the case of hybrid BF, precoding (or combining) is performed at each of a baseband end and the RF end. Thus, hybrid BF guarantees performance similar to digital BF while reducing the number of RF chains and the number of digital-to-analog (D/A) (or analog-to-digital (A/D)) converters.

For convenience of description, the hybrid BF structure may be represented by N TXRUs and M physical antennas. In this case, digital BF for L data layers to be transmitted by a transmitting end may be represented by an N*L (N by L) matrix. Thereafter, N converted digital signals are converted into analog signals by the TXRUs, and then analog BF, which may be represented by an M*N (M by N) matrix, is applied to the converted signals.

Figure 10:
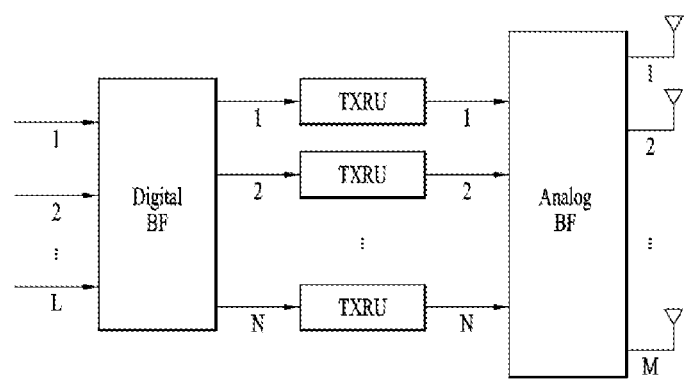
FIG. 10 is a diagram schematically illustrating a hybrid beamforming structure from the perspective of TXRUs and physical antennas according to an example of the present disclosure.

FIG. 10 is a diagram schematically illustrating a hybrid BF structure from the perspective of TXRUs and physical antennas according to an example of the present disclosure. In FIG. 10, the number of digital beams is L and the number of analog beams is N.

Additionally, a method of providing efficient BF to UEs located in a specific area by designing a BS capable of changing analog BF on a symbol basis has been considered in the NR system. Further, when N TXRUs and M RF antennas are defined as one antenna panel, a method of introducing a plurality of antenna panels in which independent hybrid BF may be applied has also been considered in the NR system according to the present disclosure.

When the BS uses a plurality of analog beams as described above, each UE may have a different analog beam suitable for signal reception. Thus, a beam sweeping operation in which the BS transmits signals (at least synchronization signals, system information, paging, etc.) by applying a different analog beam to each symbol in a specific SF in order to allow all UEs to have reception opportunities has been considered in the NR system to which the present disclosure is applicable.

Figure 11:
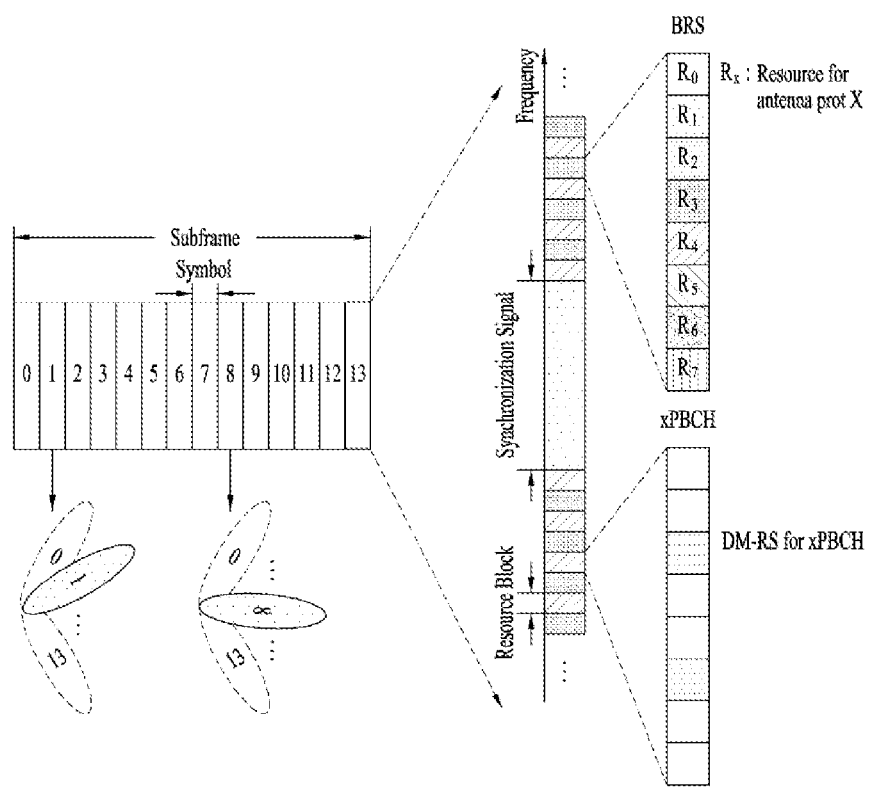
FIG. 11 is a diagram schematically illustrating a beam sweeping operation for synchronization signals and system information during a downlink (DL) transmission process according to an example of the present disclosure.

FIG. 11 is a diagram schematically illustrating a beam sweeping operation for synchronization signals and system information during a DL transmission process according to an example of the present disclosure.

In FIG. 11, a physical resource (or channel) for transmitting system information of the NR system to which the present disclosure is applicable in a broadcasting manner is referred to as a physical broadcast channel (xPBCH). In this case, analog beams belonging to different antenna panels may be simultaneously transmitted in one symbol.

In addition, the introduction of a beam reference signal (BRS) corresponding to an RS to which a single analog beam (corresponding to a specific antenna panel) is applied has been discussed as configuration for measuring a channel per analog beam in the NR system to which the present disclosure is applicable. The BRS may be defined for a plurality of antenna ports, and each BRS antenna port may correspond to a single analog beam. In this case, unlike the BRS, all analog beams in an analog beam group may be applied to the synchronization signal or xPBCH to assist a random UE in correctly receiving the synchronization signal or xPBCH.

Multiple Input Multiple Output (MIMO) RS

DMRS

A DMRS of NR is characteristically transmitted, only when necessary, to reinforce network energy efficiency and guarantee forward compatibility. Density of DMRSs in the time domain may vary according to speed or mobility of a UE. To track fast variation of a radio channel in NR, density of DMRSs in the time domain may increase.

(1) DL DMRS Related Operation

A DMRS related operation for PDSCH transmission/reception will now be described.

A BS transmits DMRS configuration information to the UE. The DMRS configuration information may refer to a DMRS-DownlinkConfig information element (IE). The DMRS-DownlinkConfig IE may include a dmrs-Type parameter, a dmrs-AdditionalPosition parameter, a maxLength parameter, and a phaseTrackingRS parameter. The 'dmrs-Type' parameter is a parameter for selecting a DMRS type to be used for DL. In NR, the DMRS may be divided into two configuration types: (1) DMRS configuration type 1 and (2) DMRS configuration type 2. DMRS configuration type 1 has a higher RS density in the frequency domain and DMRS configuration type 2 has more DMRS antenna ports. The 'dmrs-AdditionalPosition' parameter is a parameter indicating the position of an additional DMRS on DL. The 'maxLength' parameter is a parameter indicating the maximum number of OFDM symbols for a DL front-loaded DMRS. The 'phaseTrackingRS' parameter is a parameter for configuring a DL phase tracking reference signal (PTRS).

The first position of the front-loaded DMRS is determined according to a PDSCH mapping type (Type A or Type B) and an additional DMRS may be configured to support the UE at a high speed. The front-loaded DMRS occupies one or two consecutive OFDM symbols and is indicated by RRC signaling and DCI.

The BS generates a sequence used for the DMRS based on the DMRS configuration. The BS maps the generated sequence to REs. Here, the RE may include at least one of time, frequency, an antenna port, or a code.

The BS transmits the DMRS to the UE on the REs. The UE receives the PDSCH using the received DMRS.

(2) UL DMRS Related Operation

A DMRS related operation for PUSCH reception will now be described.

The UL DMRS related operation is similar to the DL DMRS related operation, and the terms of parameters related to DL may be replaced with the terms of parameters related to UL. For example, the DMRS-DownlinkConfig IE may be replaced with a DMRS-UplinkConfig IE, the PDSCH mapping type may be replaced with a PUSCH mapping type, and the PDSCH may be replaced with a PUSCH. In the DL DMRS related operation, the BS may be replaced with the UE and the UE may be replaced with the BS.

Generation of a sequence for the UL DMRS may be differently defined depending on whether transform precoding is enabled. For example, if cyclic prefix OFDM (CP-OFDM) is used (i.e., transform precoding is not enabled), the DMRS uses a pseudo-noise (PN) sequence, and if discrete Fourier transform-spread-OFDM (DFT-s-OFDM) is used (i.e., transform precoding is enabled), a Zadoff-Chu (ZC) sequence having a length of 30 or more is used.

Overview of FDR System and Interference Element in FDR

A full-duplex radio (FDR) transmission and reception system capable of simultaneously transmitting and receiving UL and DL signals in the same frequency band may increase to a maximum of twice frequency efficiency (spectral efficiency) as compared to a legacy system for transmitting and receiving UL and DL signals based on frequency and time division and thus has been spotlighted as one of core technologies of a next-generation 5G mobile communication system.

FDR using a single frequency transmission band may be defined as a transmission resource configuration scheme for simultaneously performing transmission and reception through the single frequency transmission band from the viewpoint of an arbitrary wireless device. A special example thereof may be represented as, in wireless communication between a general BS (a relay, a relay node, or a remote radio head (RRH)) and a wireless UE, a transmission resource configuration method of simultaneously performing DL transmission and UL reception of the BS and DL reception and UL transmission of the wireless UE. Another example may be represented as a transmission resource configuration method of simultaneously performing transmission and reception between the wireless UEs in the same frequency transmission band in device-to-device direct communication (D2D) between wireless UEs. While wireless transmission and reception between the general BS and the wireless UE and proposed techniques related to FDR are described in the present disclosure, a wireless network device for performing wireless transmission and reception with a UE other than the general BS may be included in the preset disclosure and direct communication between UEs may also be included.

Figure 12:
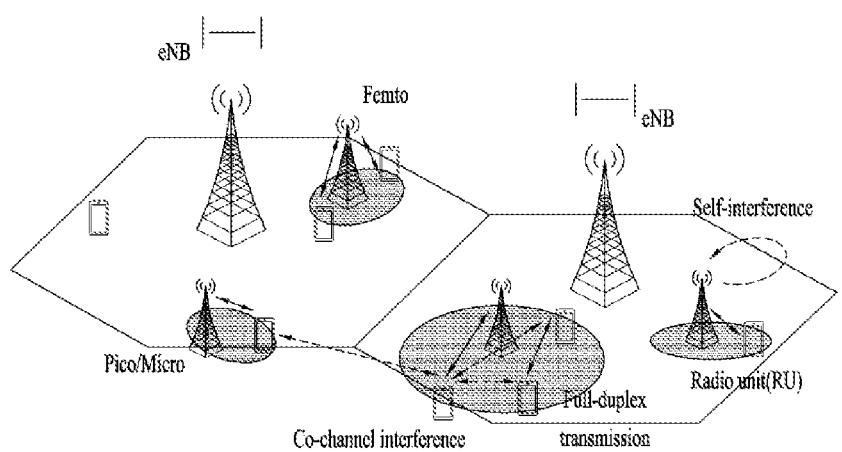
FIG. 12 is a conceptual diagram of a user equipment (UE) and a base station (BS) that support full-duplex radio (FDR)

FIG. 12 is a conceptual diagram of a UE and a BS that support FDR.

In an FDR situation illustrated in FIG. 12, the following three types of interference are produced.

Intra-device self-interference: Because transmission and reception are performed on the same time and frequency resources, a desired signal and a signal transmitted from the BS or UE are received at the same time at the BS or UE. The transmitted signal is received with almost no attenuation at a reception antenna of the BS or UE, and thus with much larger power than the desired signal. As a result, the transmitted signal serves as interference.

UE-to-UE inter-link interference: A UL signal transmitted by the UE is received at an adjacent UE and thus serves as interference.

BS-to-BS inter-link interference: The BS-to-BS inter-link interference refers to interference caused by signals that are transmitted between BSs or heterogeneous BSs (a picocell, a femtocell, and a relay) in a heterogeneous network (HetNet) state and received by a reception antenna of another BS.

Among such three types of interference, intra-device self-interference (hereinafter, self-interference (SI)) is generated only in an FDR system to significantly deteriorate performance of the FDR system. Therefore, first of all, intra-device SI needs to be cancelled in order to operate the FDR system.

Figure 13:
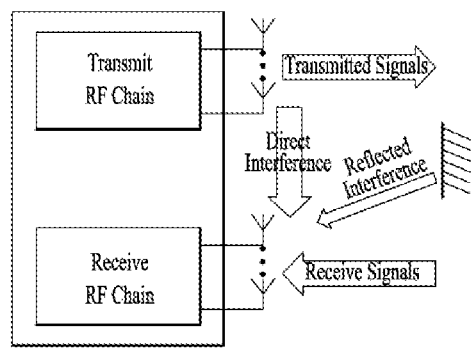
FIG. 13 is a diagram illustrating the concept of a transmission/reception link and self-interference (SI) in an FDR communication situation.

FIG. 13 is a diagram illustrating the concept of a transmission/reception link and SI in an FDR communication situation.

As illustrated in FIG. 13, SI may be divided into direct interference caused when a signal transmitted from a transmit (Tx) antenna directly enters a receive (Rx) antenna without path attenuation, and reflected interference reflected by peripheral topology. The level of SI is dramatically higher than a desired signal due to a physical distance difference. Due to the dramatically large interference intensity, efficient SI cancellation is necessary to operate the FDR system.

To effectively operate the FDR system, self-interference cancellation (self-IC) requirements with respect to the maximum transmission power of devices (in the case in which FDR is applied to a mobile communication system (bandwidth (BW)=20 MHz)) may be determined as illustrated in Table 5 below.

20-MHz BW. In relation to Table 5, for a receiver noise figure (NF), a worst case is considered with reference to the 3GPP specification requirements. A receiver thermal noise level is determined to be the sum of a thermal noise value and a receiver NF in a specific BW.

Types of SELF-IC Schemes and Methods of Applying Self-IC Schemes

Figure 14:
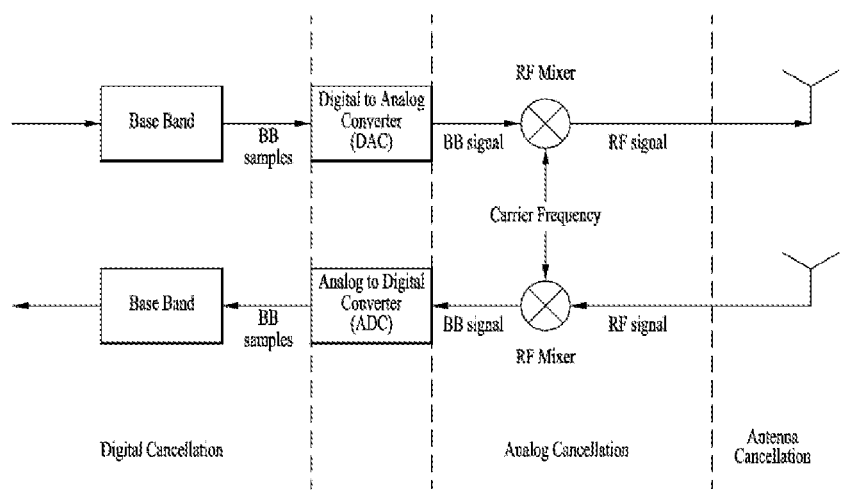
FIG. 14 is a diagram illustrating positions at which three self-IC schemes are applied, in a radio frequency (RF) transmit/receive end (or an RF front end) of a device.

FIG. 14 is a diagram illustrating positions at which three self-IC schemes are applied, in an RF Tx/Rx end (or an RF front end) of a device. Hereinafter, a brief description will be given of the three self-IC schemes.

Antenna self-IC: Antenna self-IC is a self-IC scheme that should be performed first among all self-IC schemes. SI is cancelled at an antenna end. Most simply, transfer of an SI signal may be physically blocked by placing a signal-blocking object between a Tx antenna and an Rx antenna, or a part of an SI signal may be canceled by artificially controlling the distance between antennas using multiple antennas or by inverting a phase of a specific Tx signal. Further, a part of an SI signal may be cancelled by means of multiple polarized antennas or directional antennas.

Analog self-IC: Interference is canceled at an analog end before an Rx signal passes through an ADC. An SI signal is canceled using a duplicated analog signal. This operation may be performed in an RF region or an intermediate frequency (IF) region. A specific SI signal cancellation method is described below. A duplicate of an actually received SI signal is generated by delaying an analog Tx signal and then controlling the amplitude and phase of the delayed Tx signal, and the duplicate signal is subtracted from a signal received at an Rx antenna. However, due to analog signal-based processing, the resulting implementation complexity and circuit characteristics may cause additional distortion, thereby significantly changing IC performance.

Digital self-IC: Interference is canceled after an Rx signal passes through an ADC. Digital self-IC covers all IC techniques performed in a baseband region. Most simply, a duplicate of an SI signal is generated using a digital Tx signal, and the duplicate signal is subtracted from an Rx digital signal. Alternatively, techniques of performing precoding/postcoding in a baseband using multiple antennas so that a Tx signal of a UE or a BS may not be received at an Rx antenna may be classified as digital self-IC. However, since digital self-IC is performed only when a digital modulated signal is quantized to a level sufficient to recover information of a desired signal, there is a need for the prerequisite that the difference between signal powers of an

TABLE 5

| Node Type | Max. Tx Power ($P_A$) | Thermal Noise (BW = 20 MHz) | Receiver NF | Receiver Thermal Noise Level | Self-IC Target ($P_A$- TN-NF) |
|---|---|---|---|---|---|
| Macro eNB | 46 dBm | −101 dBm | 5 db (for eNB) | −96 dBm | 142 dB |
| Pico eNB | 30 dBm | | | | 126 dB |
| Femto eNB, WLAN AP | 23 dBm | | | | 119 dB |
| UE | 28 dBm | | 9 db (for UE) | −92 dBm | 115 dB |

Referring to Table 5, it may be noted that, to effectively operate the FDR system in a 20-MHz BW, the UE needs 119-dBm self-IC performance. A thermal noise value may be changed to $N_{0,BW}$=−174 dBm+10 $\log_{10}$(BW) according to the BW of the mobile communication system. In Table 5, the thermal noise value is calculated on the assumption of a interference signal remaining after IC using one of the above-described techniques and a designed signal should fall into an ADC range in order to perform digital Self-IC.

Figure 15:
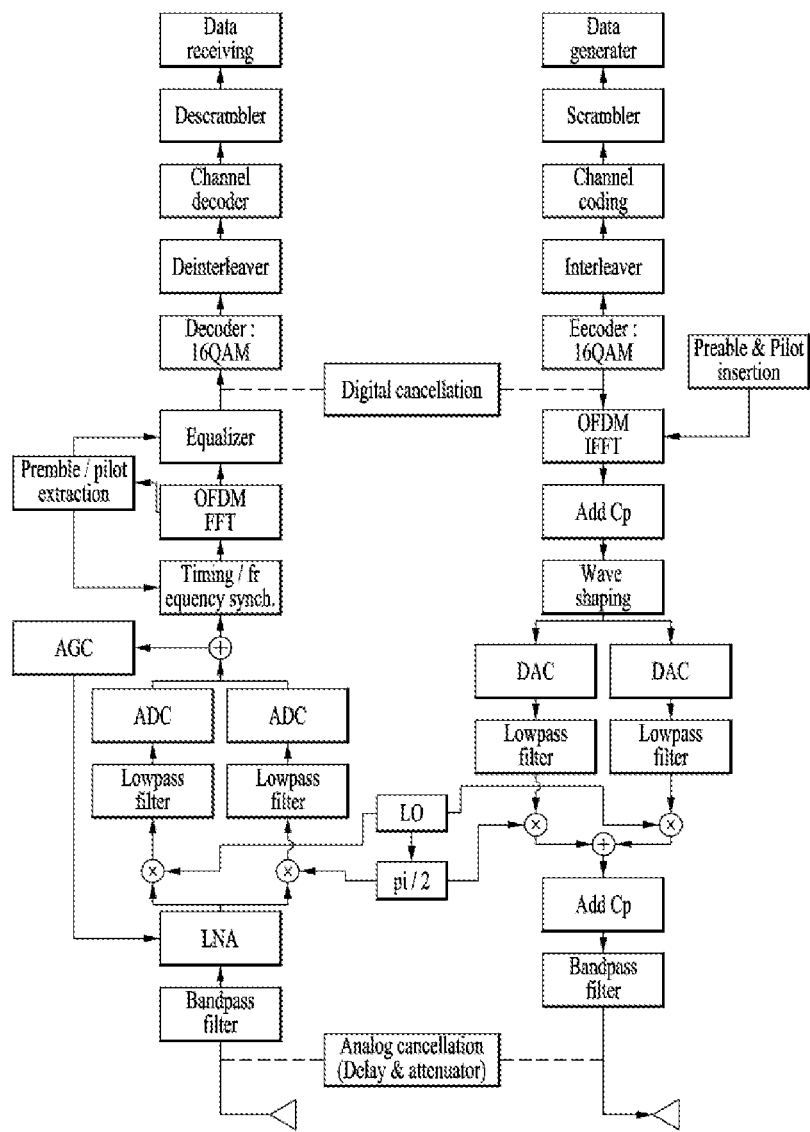
FIG. 15 is a block diagram of a self-interference cancellation device in a proposed communication apparatus in an OFDM communication environment based on FIG. 14.

FIG. 15 is a block diagram of a self-IC device in a proposed communication apparatus in an OFDM communication environment based on FIG. 14.

While FIG. 15 shows that digital self-IC is performed using digital SI signal information before digital-to-analog conversion and after analog-to-digital conversion, digital self-IC may be performed using a digital SI signal after inverse fast Fourier transform (IFFT) and before fast Fourier transform (FFT). In addition, although FIG. 15 is a conceptual diagram of self-IC though separation of a Tx antenna and an Rx antenna, if antenna IC is performed using a single antenna, an antenna configuration scheme may be different from antenna configuration of FIG. 15. A functional block may be added to or removed from the self-IC device of FIG. 15 according to purpose.

Signal Modeling of FDR System

Since the FDR system uses the same frequency between a Tx signal and an Rx signal, non-linear components in RF significantly affect the Tx and Rx signals. In particular, the Tx signal is distorted by non-linear properties of active elements such as a power amplifier (PA) of a Tx RF chain and a low-noise amplifier (LNA) of an Rx RF chain, such distortion may be modified by a mixer in the Tx/Rx RF chain. Due to such distortion, the Tx signal may be modeled as generation of components corresponding to a high order. Components corresponding to an even order among the high-order components have influence on the vicinity of direct current (DC) and a high frequency region corresponding to several multiples of a center frequency and thus may be efficiently cancelled using an existing alternating current (AC) coupling or filtering scheme. However, components corresponding to an odd order are generated in the vicinity of a center frequency and thus cannot be easily cancelled unlike the even order components, thereby having a significant influence on reception. In consideration of non-linear properties of the odd-order components, an Rx signal subjected to ADC in the FDR system may be expressed using the Parallel Hammerstein (PH) model as shown in Equation 1 below.

$$y(n) = h_D(n) * x_D(n) + \sum_{\substack{k=1,\ldots,K \\ k=odd}} h_{SI,k}(n) * |x_{SI}(n)|^{k-1} x_{SI}(n) + z(n), \quad \text{[Equation 1]}$$

where $x_D(n)$ denotes data to be received, $h_D(n)$ denotes a desired channel experienced by data to be received, $x_{SI}(n)$ denotes data transmitted by a Tx end, $h_{SI,k}(n)$ denotes a self-channel experienced by data transmitted by the Tx end and indicates a linear component for k=1 and a non-linear component for k having an odd number of 3 or more, and z(n) denotes additive white gaussian noise (AWGN).

Figure 16:
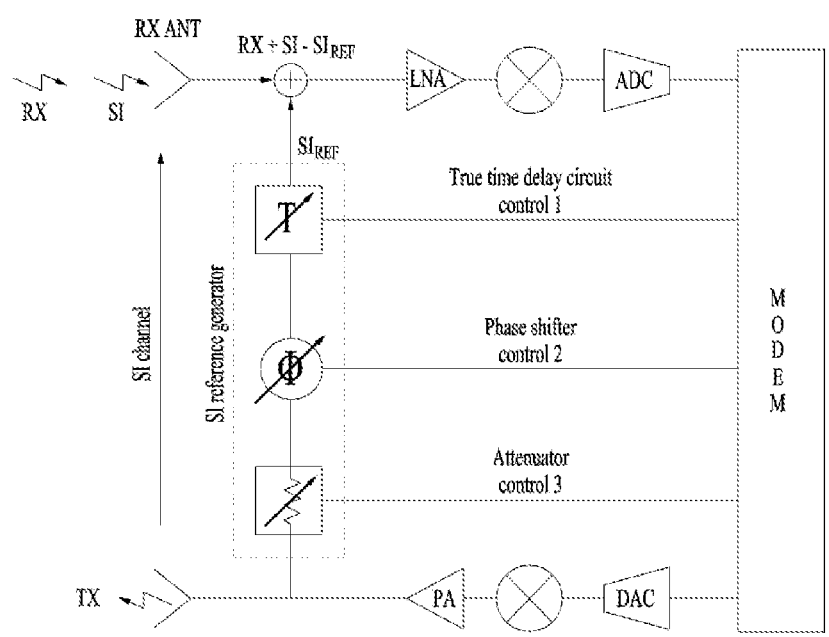
FIG. 16 is a diagram illustrating an RF chain of a communication device for performing general FDR technology.

FIG. 16 is a diagram illustrating an RF chain of a communication device for performing general FDR technology.

In order to cancel an SI signal in a communication device using FDR, it is necessary to generate a duplicate signal, which is exactly identical to the SI signal, (hereinafter, an SI RS). Referring to FIG. 16, for cancellation of the SI signal, a method of subtracting the SI RS $SI_{REF}$ from the SI signal before an Rx signal arrives at an LNA of an Rx end of the RX chain is generally used. In order to generate the SI RS $SI_{REF}$, a communication device branches a Tx signal of a Tx end (the Tx signal is branched after passing through a PA of the Tx end in FIG. 16) and causes a portion of the Tx signal to pass through an SI reference generator including an attenuator, a phase shifter, and a true time delay circuit. The SI reference generator generates the SI RS to copy an SI channel using the branched Tx signal. In order for the SI reference generator to copy the SI channel, a channel through which the SI signal is received is separately estimated.

The communication device may estimate the SI channel and then generate a control signal input to the true time delay circuit, a control signal input to the phase shifter, and a control signal input to the attenuator. In this case, the communication device should be in a state in which all of the SI RS and a desired Rx signal are not received.

The communication device may control the SI reference generator using two methods.

According to the first method, in order to separately estimate the channel through which the SI signal is received, the communication device may stop performing communication and transmit an SI channel estimation signal (e.g., a pilot signal, an RS, etc.) in an allocated communication band (or a channel band), and the SI reference generator may copy the SI signal using information about the SI channel estimation signal upon communication.

According to the second method, the communication device may transmit the SI channel estimation signal (e.g., an RS, a pilot signal, a tone, etc.) carried in both ends (e.g., a guard band) of a communication channel band and control the SI reference generator so as to reduce power of the corresponding SI channel estimation signal according to an adaptive feedback algorithm.

In the first method, it is necessary to first estimate the SI channel in order to find an optimized state of the SI reference generator. To this end, an Rx device (or an Rx side) as well as a Tx device (or a Tx side) should stop performing communication. In addition, even though perfect SI channel estimation is performed, a channel of an SI reference path needs to be very precisely calibrated. The channel of the SI reference path should be configured through a lookup table based on a combination of all control voltages. Even when the lookup table is accurately composed using a specific Tx power and temperature, the lookup table is supposed to change depending on an original Tx power and a temperature of a circuit. Hence, SI signal cancellation performance is inevitably degraded due to a calibration error and a difference in condition between a current Tx power and temperature and a Tx power and temperature at the timing of composing the lookup table. Moreover, it is difficult for the lookup table to follow an SI signal channel (or SI channel) that changes depending on time.

In the second method, since the communication device may transmit the SI channel estimation signal (the tone, pilot signal, RS, etc.) carried in both sides of a communication band without stopping performing communication and continuously control the SI reference generator in time using the adaptive feedback algorithm, calibration of the SI reference generator is unnecessary. However, since the SI reference generator is controlled using a tone of a guard band in both sides of the communication band, instead of using the communication band, an SI signal caused by transmission of a tone inside the communication band, which is most important, is not cancelled.

Figure 17:
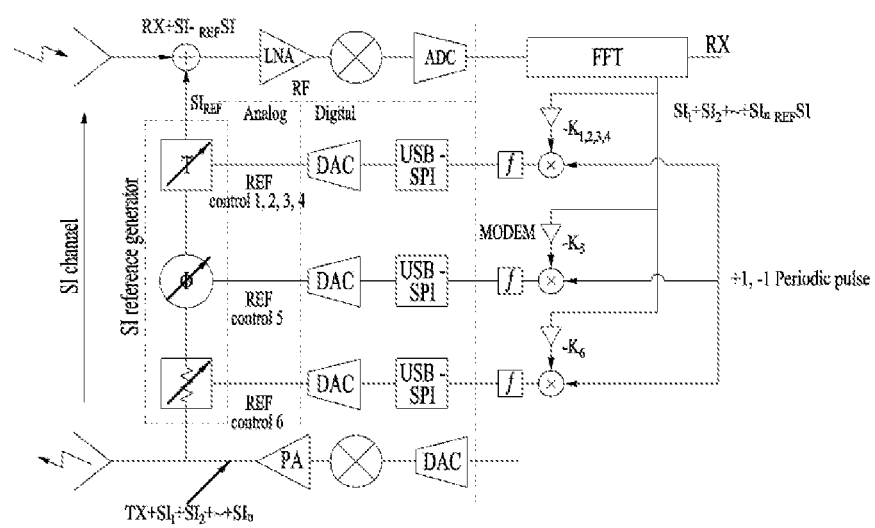
FIG. 17 is a diagram illustrating an example of an RF chain structure of a communication device for cancelling an SI signal when an FDR scheme is used.

FIG. 17 is a diagram illustrating an example of an RF chain structure of a communication device for cancelling an SI signal when an FDR scheme is used.

Referring to FIG. 17, the RF chain of the communication device may include a communication modem (or a modem), an SI reference generator, a Tx antenna, an Rx antenna, etc. The communication modem may include a fast Fourier transform (FFT) unit and integrators. The SI reference generator may include an attenuator, a phase shifter, and a true time delay circuit.

To precisely generate (or duplicate) an SI RS, the SI reference generator may control all of the attenuator, the phase shifter, and the true time delay circuit in an analog manner. To this end, the RF chain may include digital-to-analog converters (DACs) that convert control signals transmitted by the communication modem (or modem) into analog signals.

According to the concept of a true time delay defined basically as a slope of phase shift to a frequency band, since the true time delay circuit is incapable of controlling the true time delay only with information about a single frequency, it is necessary to obtain information about at least two frequencies in order to perform SI signal cancellation in a wide band. Therefore, it is assumed that two or more pilot signals, two or more RSs, or two or more tones, which are test signals, are transmitted.

In order to control the SI reference generator, how to use multiple RSs (or multiple tones, multiple pilot signals, etc.), which are test signals, is described. First of all, the communication modem (or modem) shown in FIG. 17 may monitor a sum of powers of the multiple tones in frequencies in which the multiple tones corresponding to the test signals are located, measure respective powers at the frequency positions at which the multiple tones are transmitted to calculate the sum of the measured powers. Here, the powers measured at the frequency positions of the transmitted tones correspond to powers of SI signals.

The communication modem may transmit a control signal for minimizing a difference between the sum of the powers of the SI signals based on the multiple tones and a power of the SI RS. Namely, the communication modem may feed back a control signal for causing the sum of the powers of the SI signals based on the multiple tones to be minimum to the SI reference generator. The SI reference generator generates the SI reference signal according to the fed-back control signal. To control the sum of the measured powers of the SI signals, the communication modem may generate an SI RS having a power value closest to this sum.

The communication modem may control the SI reference generator using an adaptive feedback loop until the sum ($SI=SI_1+SI_2+SI_3+ \ldots +SI_n$) of the powers of the SI signals is minimized. Here, $SI_n$ is a power of an SI signal measured at a frequency position at which an n-th RS among a plurality of RSs is transmitted. The communication modem uses a periodic pulse signal of +1 and −1 to change a sign of an increment of a controlled bias voltage using a loop function of adaptive feedback. The loop function means a function for searching for surroundings of a current variable in a feedback loop including a variable to be controlled.

The communication modem may feedback control signals to the phase shifter, the attenuator, and the true time delay circuit, respectively, using the adaptive feedback loop so as to enable the SI reference generator to generate an SI RS having a power closest to the sum of the powers of the SI signals.

The method of controlling the SI RS according to FIG. 17 is advantageous in that complicated channel estimation and calibration are not required because the adaptive feedback algorithm is operated only with the sum of the powers of the multiple tones.

Figure 18:
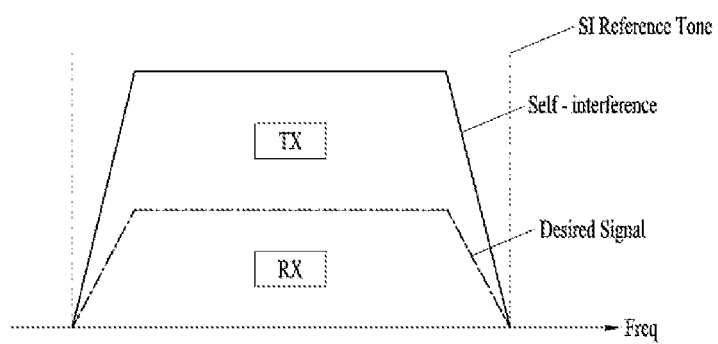
FIG. 18 is a diagram illustrating two tones transmitted in both sides of a communication band to control an SI reference generator.

FIG. 18 is a diagram illustrating two tones transmitted in both sides (e.g., a guard band) of a communication band to control an SI reference generator.

Referring to FIG. 18, SI channel estimation tones are included in both sides (a guard band) of the communication channel band and the SI reference generator may be controlled so as to reduce powers of the SI channel estimation tones according to the adaptive feedback algorithm. Then, a desired signal from which SI is cancelled may be stably received.

In a legacy full duplex radio (FDR) communication system, a beam that a specific UE selects for cancelling a transmission (Tx) SI signal increases cross-link interference (CLI) to other UEs, thereby degrading performance. For SI cancellation, a beam should be precisely adjusted. In this case, CLI for a UE in the direction of a main lobe may further be increased. Accordingly, when CLI for other UEs is not considered in SI cancellation based on a beam, the overall performance of UEs within a cell is degraded.

Therefore, a beam pattern should be determined in consideration of the situations of other UEs. For this purpose, the help of a BS capable of identifying the whole situations of UEs is required. The UEs within the cell may be classified into aggressor UEs and victim UEs depending on the situations of the UEs. Under circumstances, each UE may serve as an aggressor UE, a victim UE, or both.

Aggressor UE: a UE that transmits a Tx signal by forming a beam pattern.

Victim UE: a UE that receives interference caused by a beam from an aggressor UE.

A beam selection procedure is performed in three steps. In the first step, UEs within a cell are grouped. In the second step, an aggressor UE transmits beam patterns to UEs within a group, victim UEs measure CLI of the beam patterns, and the aggressor UE measures SI of the beam patterns. In the third step, a BS determines a beam pattern for the aggressor UE based on the measurements obtained in the second step and indicates the determined beam pattern to the aggressor UE, and the aggressor UE applies the beam pattern.

The UEs within the cell are grouped into a plurality of groups in the first step. As UEs affecting each other in the cell are grouped into one group, the number of beam patterns which should be measured and reported to the BS by each UE in the next step may be appropriately controlled. If the number of UEs within the cell is equal to or less than an appropriate value, a CLI and SI measurement process may be performed with the whole cell regarded as one group in the next step.

In the second step, the BS and each UE perform the following operations.

The BS gives opportunities to each UE within the cell or a specific group, in which the UE may measure CLI of beams from other UEs. FIG. 19 is a diagram illustrating time division for enabling each UE to transmit a signal while switching beam patterns and measure signals received from other UEs according to the present disclosure. The BS may divide time such that each UE may detect Tx beam patterns and measure CLI from the other UEs, as illustrated in FIG. 19. When a UE which performs simultaneous transmission and reception in full duplex transmits a signal, while switching Tx beam patterns, the transmission may affect SI cancellation performance, which should be considered.

Figure 20:
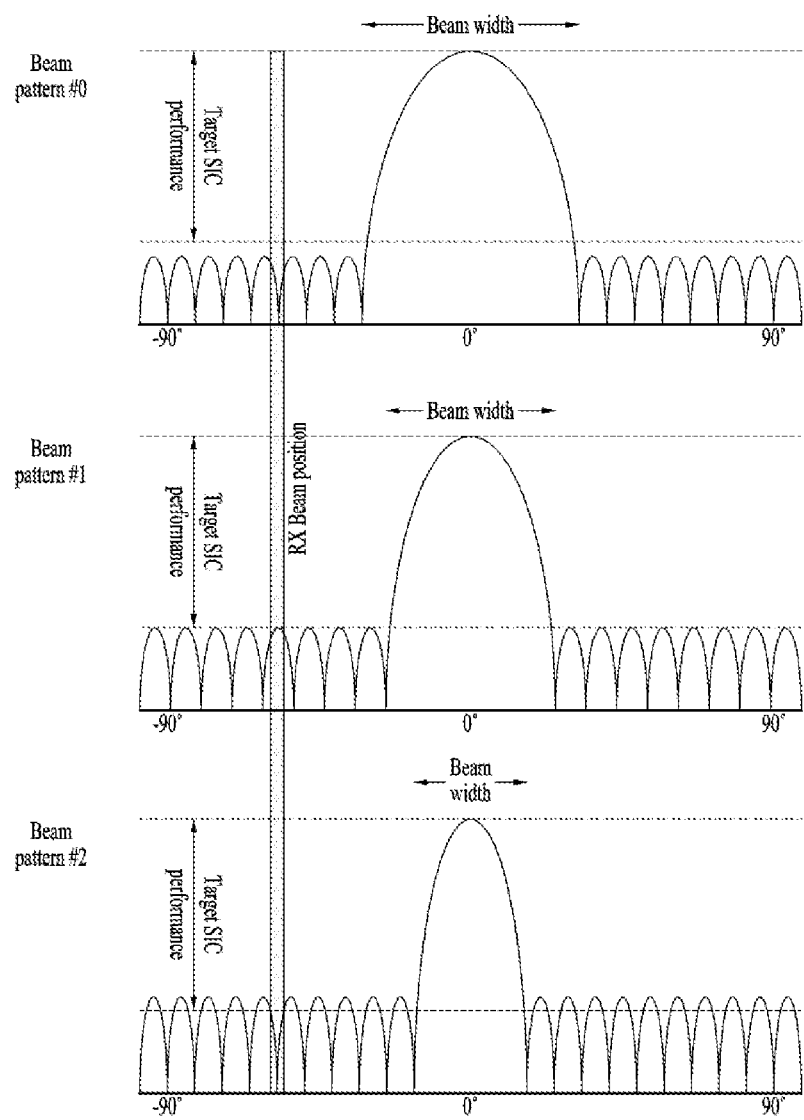
FIG. 20 is a diagram illustrating exemplary beam patterns available for an aggressor UE according to the present disclosure.

An aggressor UE generates a beam pattern for SI cancellation. The aggressor UE generates second best and third best beam patterns as well as the best beam pattern in terms of performance, and transmits Tx signals while switching the beam patterns. FIG. 20 is a diagram illustrating exemplary beam patterns available for an aggressor UE according to the present disclosure.

In beam pattern #0, the power of side lobs is lowered to or below a desired level. When SI is cancelled simply by lowering the power of side lobes as such, a main lob becomes large, thereby increasing CLI to other UEs. In beam pattern #1, the main lobe is decreased in size by matching the power of the side lobes to the desired level. In beam pattern #2, a beam is formed such that the size of the main lobe may be reduced by further increasing the sizes of the side lobes and SI may be located between the null between side lobes to satisfy target SIC performance. In this case, although CLI to other UEs may be reduced by decreasing the size of the main lobe, the beam pattern should be controlled more precisely.

As in the above example, the aggressor UE may form a plurality of beam patterns which may satisfy target SIC performance, and apply the beam patterns to Tx times allocated by the BS, so that the other UEs may measure channel information such as CLI or the like.

A victim UE measures channel information such as CLI or the like at reception (Rx) measurement times allocated by the BS and transmits the measurements to the BS.

Figure 21:
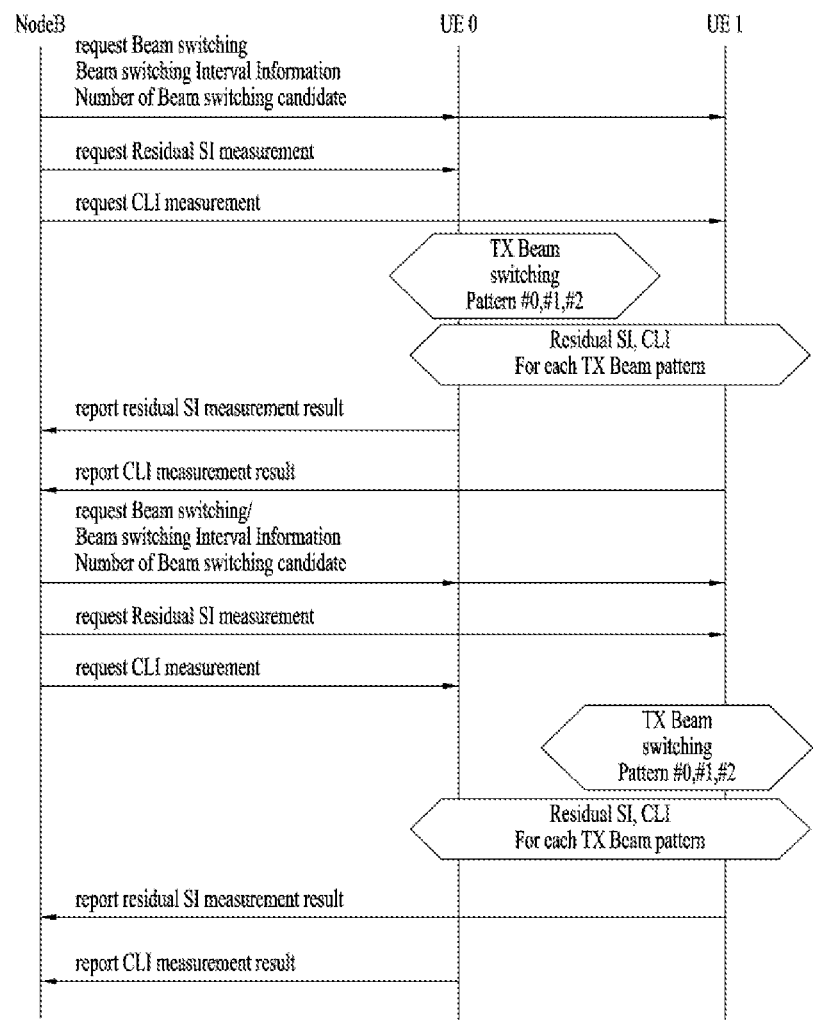
FIG. 21 is a diagram illustrating a process of transmission (Tx) beam pattern switching and measurement reporting between a BS and UEs according to the present disclosure.

FIG. 21 is a diagram illustrating a process of Tx beam pattern switching and measurement reporting between a BS and UEs according to the present disclosure. The BS and the UEs play the above-described roles and their overall operations are performed in the procedure of FIG. 21.

1. The BS transmits a beam switching request together with information about a beam switching interval and the number of beam switching candidates to the UEs of a group, to determine optimal Tx beam patterns for the UEs in the group. For example, the beam switching request is set to true for an aggressor UE that is supposed to perform beam switching. Table 6 below is an embodiment of beam switching parameters transmitted when an initial beam switching request is transmitted. In Table 6, a bit size may be appropriately changed.

TABLE 6

| IE | Value |
| --- | --- |
| Beam switching request | True or False |
| Beam switching interval | 10 bit |
| Number of Beam switching candidate | 10 bit |

2. Upon receipt of the beam switching request, a UE switches its beam pattern to candidate Tx beam patterns and measures residual SI according to the beam pattern switching.

3. The other UEs which have not received the beam pattern switching request measure CLI.

4. The measured residual SI and CLI are reported to the BS. This operation is performed for Tx patterns of all UEs within the group.

5. The BS which has identified the states of the UEs according to the Tx patterns determines a beam pattern for each UE in a manner that maximizes the overall performance of the UEs within the cell or the specific group, and transmits beam pattern information including information about the determined beam pattern to the UE.

Figure 22:
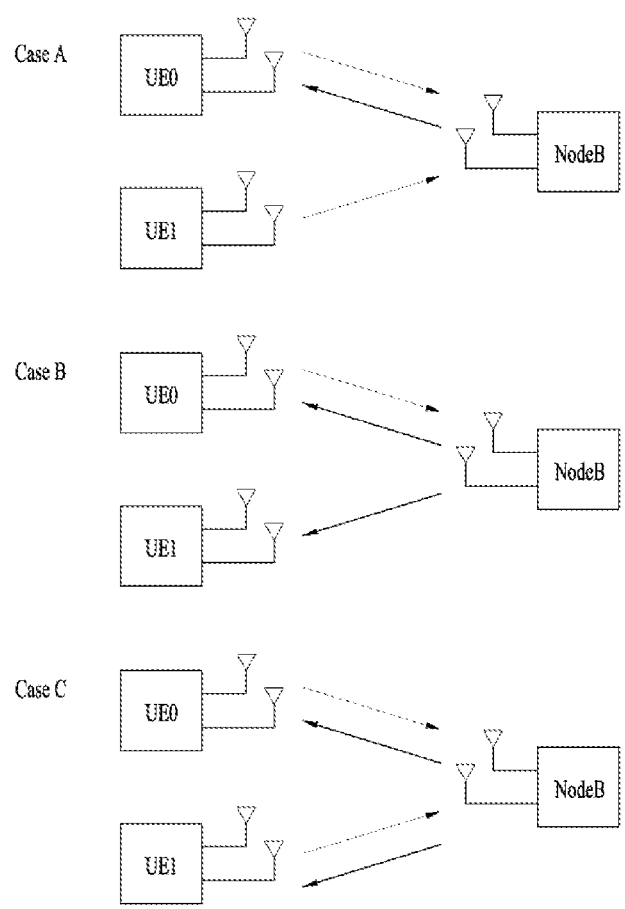
FIG. 22 is a diagram illustrating the operation states of UEs within a group, which a BS considers in determining a beam pattern according to the present disclosure.

FIG. 22 is a diagram illustrating the operation states of UEs within a group, which a BS considers in determining a beam pattern according to the present disclosure.

The BS optimizes the overall performance of UEs within a group in consideration of the operation states of the UEs in the group. FIG. 22 illustrates such cases.

In Case A, UE0 performs transmission and reception at the same time, and UE1 performs transmission. Because UE1 does not perform data reception, UE0 may select the best beam pattern in terms of SI cancellation. The BS increases the performance of UE0 by allowing UE0 to use the best beam pattern in terms of SI cancellation in this situation.

In Case B, UE0 performs transmission and reception at the same time, and UE1 performs reception. Because the transmission of UE0 and the reception of UE1 take place simultaneously, the reception performance of UE1 may be degraded by a beam pattern of UE0. Then, the BS instructs UE0 to use a beam pattern that degrades the performance of UE1 less in consideration of the overall performance of UE0 and UE1.

In Case C, both UE0 and UE1 perform transmission and reception at the same time. Each of UE0 and UE1 serves as at once an aggressor UE and a victim UE for the other UE. The BS instructs UE0 to use a beam pattern that degrades the performance of UE1 less and instructs UE1 to use a beam pattern that degrades the performance of UE0 less, thereby increasing overall performance.

Figure 23:
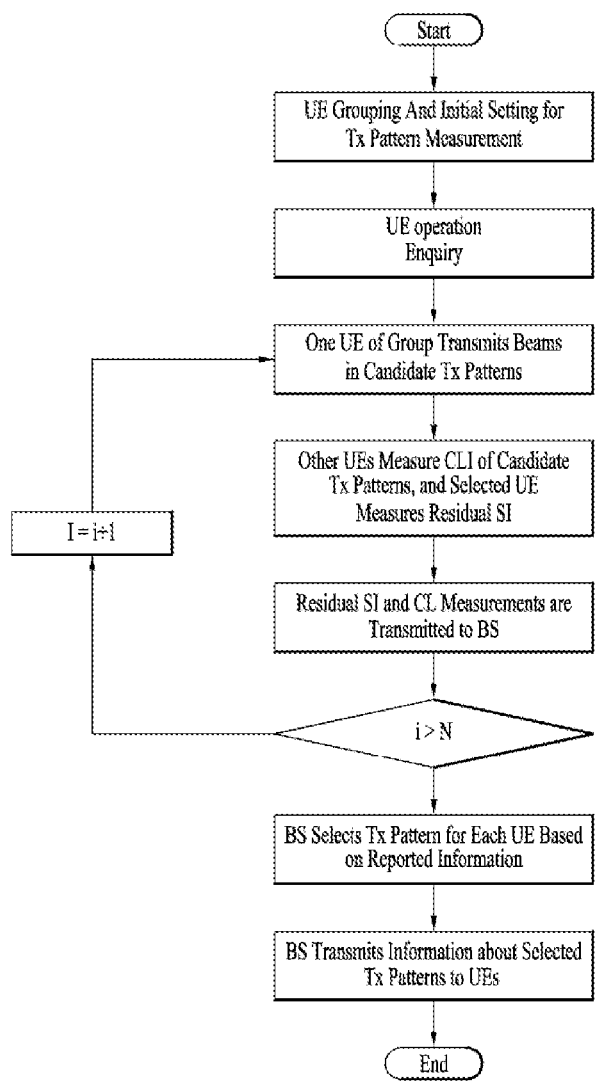
FIG. 23 is a flowchart illustrating an overall method of operating a BS and UEs according to the present disclosure.

FIG. 23 is a flowchart illustrating an overall method of operating a BS and UEs according to the present disclosure.

According to FIG. 23, a BS initially performs UE grouping, for measurement and reporting of the influences of Tx patterns, and identifies the operation modes (transmission and reception, reception only, or transmission only) of UEs at the time. The BS requests a UE in a group to transmit candidate patterns, the UE transmits test patterns corresponding to the candidate patterns, and the other UEs of the group measure CLI of the test patterns. The UE transmitting the test patterns measures residual SI corresponding to the test patterns. When the measurements are completed for the test patterns, the measurement results are reported to the BS. This process is repeated until measurements are completed for Tx patterns of all UEs in the group. Measurement values of these patterns are all reported to the BS, and then the BS indicates a Tx beam pattern suitable for each UE in consideration of the operation mode of the UE, thus completing the beam pattern selection operation. This beam pattern selection process may be performed periodically or aperiodically.

The present disclosure provides the following.

1) A process in which a BS requests a UE in a group to transmit specific Tx patterns in order to optimize a Tx beam pattern for the UE, and the other UEs in the group receive the specific Tx patterns and report interference caused by the specific Tx patterns to the BS in a full duplex communication system.

2) A process in which a BS requests a UE in a group to transmit specific Tx patterns in order to optimize a Tx beam pattern for the UE, and the UE reports SI caused by the specific Tx patterns to the BS in a full duplex communication system.

3) A process in which a BS requests a UE in a group to transmit a specific Tx pattern and sequentially transmits this request to the UEs of the group.

4) A process in which a BS determines a Tx pattern suitable for each UE based on collected information about residual SI signals for specific Tx patterns of each UE in the group, interference between UEs, information about the transmission and reception states (both transmission and reception, transmission only, or reception only) of the UEs.

Hereinbelow, devices for performing the above-described proposed methods will be described in detail.

Examples of Communication System to Which Present Disclosure is Applied

The description, functions, procedures, proposals, methods, and/or operational flowcharts disclosed in the present disclosure may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 24:
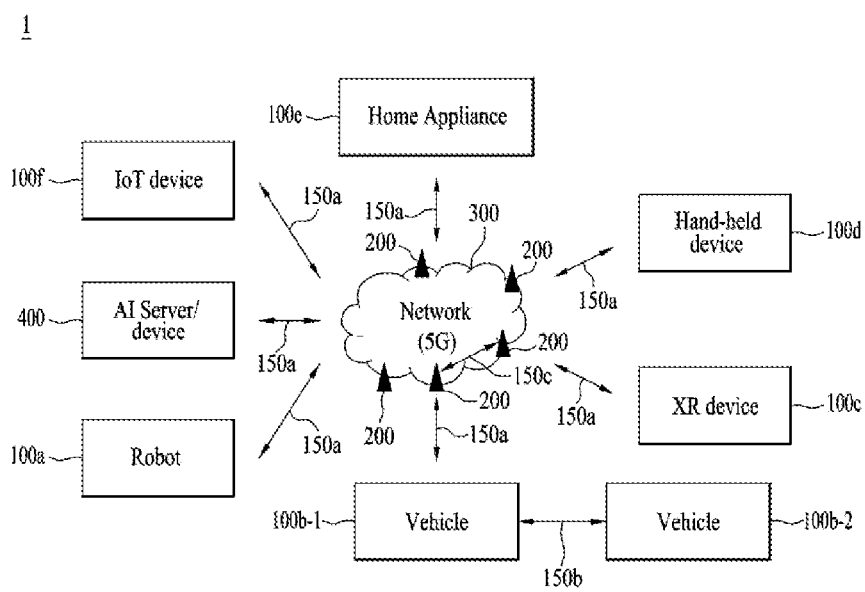
FIG. 24 illustrates a communication system applied to the present disclosure.

FIG. 24 illustrates a communication system applied to the present disclosure.

Referring to FIG. 24, a communication system 1 applied to the present disclosure includes wireless devices, BSs, and a network. Here, the wireless devices represent devices performing communication using RAT (e.g., 5G NR or LTE) and may be referred to as communication/radio/5G devices. The wireless devices may include, without being limited to, a robot 100a, vehicles 100b-1 and 100b-2, an extended reality (XR) device 100c, a handheld device 100d, a home appliance 100e, an Internet of things (IoT) device 100f, and an artificial intelligence (AI) device/server 400. For example, the vehicles may include a vehicle having a wireless communication function, a self-driving vehicle, and a vehicle capable of performing vehicle-to-vehicle communication. The vehicles may include an unmanned aerial vehicle (UAV) (e.g., a drone). The XR device may include an augmented reality (AR)/virtual reality (VR)/mixed reality (MR) device and may be implemented in the form of a head-mounted device (HIVID), a head-up display (HUD) mounted in a vehicle, a television, a smartphone, a computer, a wearable device, a home appliance device, digital signage, a vehicle, a robot, etc. The handheld device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless device 200a may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/vehicle-to-everything (V2X) communication). In addition, the IoT device 100f (e.g., a sensor) may perform direct communication with other IoT devices (e.g., sensors) or other wireless devices 100a to 100f.

Wireless communication/connections 150a, 150b, and 150c may be established between the wireless devices 100a to 100f and the BSs 200, between wireless devices 100a to 100f, and between the BSs 200, respectively. Here, the wireless communication/connections may be established using various RATs (e.g., 5G NR) such as UL/DL communication 150a, sidelink communication 150b (or D2D communication), and communication 15c between the BSs (e.g., a relay or integrated access backhaul (IAB)). The wireless devices and the BSs, the wireless device and the wireless device, and the BS and the BS may transmit/receive radio signals to/from each other through the wireless communication/connections 150a, 150b, and 150c. For example, the wireless communication/connections 150a, 150b, and 150c may transmit/receive signals through various physical channels. To this end, at least a part of various configuration information configuring processes, various signal processing processes (e.g., channel encoding/decoding, modulation/demodulation, and resource mapping/demapping), and various resource allocation processes, for transmitting/receiving radio signals, may be performed based on the various proposals of the present disclosure.

Examples of Wireless Devices to Which the Present Disclosure is Applied

Figure 25:
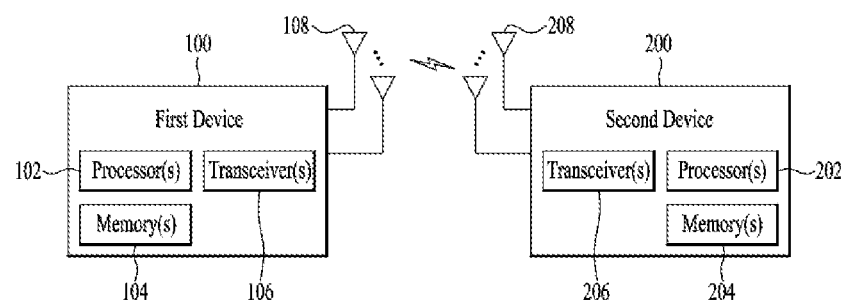
FIG. 25 illustrates wireless devices applicable to the present disclosure.

FIG. 25 illustrates wireless devices applicable to the present disclosure.

Referring to FIG. 25, a first wireless device 100 and a second wireless device 200 may transmit and receive signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 24.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the description, functions, procedures, proposals, methods, and/or operational flowcharts disclosed in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or the entirety of processes controlled by the processor(s) 102 or store software code including instructions for performing the description, functions, procedures, proposals, methods, and/or operational flowcharts disclosed in the present disclosure. Here, the processor(s) 102 and the memory(s) 104 may be a part of a communication modem/circuit/chipset designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with RF unit(s). In the present disclosure, the wireless device may represent the communication modem/circuit/chip set.

Specifically, the chipset may include the processor(s) 102 and the memory(s) 104. The memory(s) 104 may include at least one program capable of performing an operation related to the above-described embodiments. The processor(s) 102 may receive FDR-related resources that are allocated based on the at least one program stored in the memory(s) 104.

The processor(s) 102 may control the transceivers(s) 106 to report self-IC capability to the BS. The processor(s) 102 may control the transceivers(s) 106 to receive resource allocation information about a preconfigured time duration divided into a first time resource duration and a second time resource duration from the BS. The first time resource duration may be a time resource duration allocated to simultaneously perform transmission of a UL signal and reception of a DL signal in the same frequency band, and the second time resource duration may be a time resource duration allocated for transmission of the UL signal or reception of the DL signal. The first time resource duration and the second time resource duration may be determined based on the self-IC capability, the amount of first data related to the UL signal, and the amount of second data related to the DL signal.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the description, functions, procedures, proposals, methods, and/or operational flowcharts disclosed in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or the entirety of processes controlled by the processor(s) 202 or store software code including instructions for performing the description, functions, procedures, proposals, methods, and/or operation flowcharts disclosed in the present disclosure. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent the communication modem/circuit/chip set.

The processor(s) 202 related to the BS may control the transceivers(s) 206 to receive a report on self-IC capability related to FDR from the UE. The processor(s) 202 may determine a first time resource duration during which transmission and reception of UL and DL signals are simultaneously performed and a second time resource duration during which transmission of the UL signal or reception of the DL signal is performed. The processor(s) 202 may control the transceiver(s) 206 to transmit resource allocation information including information about the first time resource duration and the second time resource duration to the UE.

As another aspect of the present disclosure, a computer readable storage medium including at least one computer program for causing, when executed, the at least one processor to perform an operation is provided. The operation may include providing information related to self-IC capability to the BS and receiving resource allocation information about a preconfigured time duration divided into a first time resource duration and a second time resource duration from the BS. The first time resource duration may be a time resource duration allocated to simultaneously perform transmission of a UL signal and reception of a DL signal in the same frequency band, and the second time resource duration may be a time resource duration allocated for transmission of the UL signal or reception of the DL signal. The first time resource duration and the second time resource duration may be determined based on the self-IC capability, the amount of first data related to the UL signal, and the amount of second data related to the DL signal.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the description, functions, procedures, proposals, methods, and/or operational flowcharts disclosed in the present disclosure. The one or more processors 102 and 202 may generate messages, control information, data, or information according to the description, functions, procedures, proposals, methods, and/or operational flowcharts disclosed in the present disclosure. The one or more processors 102 and 202 may generate signals (e.g., baseband signals) including PDUs, SDUs, messages, control information, data, or information according to the description, functions, procedures, proposals, methods, and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the description, functions, procedures, proposals, methods, and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The description, functions, procedures, proposals, methods, and/or operational flowcharts disclosed in the present disclosure may be implemented using firmware or software, and the firmware or software may be configured to include the modules, procedures, or functions. Firmware or software configured to perform the description, functions, procedures, proposals, methods, and/or operational flowcharts disclosed in the present disclosure may be included in the one or more processors 102 and 202 or stored in the one or more memories 104 and 204 so as to be driven by the one or more processors 102 and 202. The description, functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured as read-only memories (ROMs), random access memories (RAMs), electrically erasable programmable read-only memories (EPROMs), flash memories, hard drives, registers, cache memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the description, functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the description, functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Use Cases of Wireless Devices to Which Present Disclosure is Applied

Figure 26:
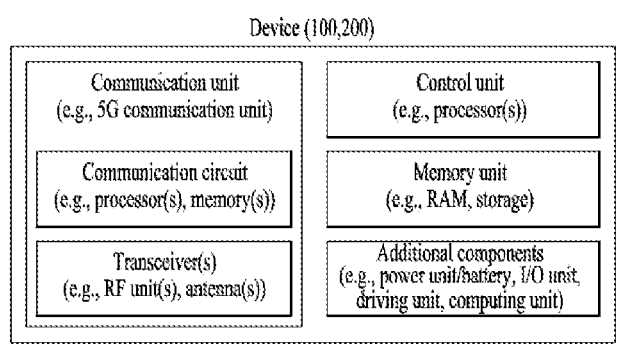
FIG. 26 illustrates another example of a wireless device applied to the present disclosure.

FIG. 26 illustrates another example of a wireless device applied to the present disclosure. The wireless device may be implemented in various forms according to use cases/services.

Referring to FIG. 26, wireless devices 100 and 200 may correspond to the wireless devices 100 and 200 of FIG. 25 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 25. For example, the transceiver(s) 114 may include the one or more transceivers 106 and 206 and/or the one or more antennas 108 and 208 of FIG. 25. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, an input/output (I/O) unit, a driving unit, and a computing unit. The wireless device may be implemented in the form of, without being limited to, the robot (100a of FIG. W1), the vehicles (100b-1 and 100b-2 of FIG. 24), the XR device (100c of FIG. 24), the handheld device (100d of FIG. 24), the home appliance (100e of FIG. 24), the IoT device (100f of FIG. 24), a digital broadcast terminal, a holographic device, a public safety device, an MTC device, a medicine device, a fintech device (or a finance device), a security device, a climate/environment device, the AI server/device (400 of FIG. 24), the BSs (200 of FIG. 24), a network node, etc. The wireless device may be used in a mobile or fixed place according to a use case/service.

In FIG. 26, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphics processing unit, and a memory control processor. As another example, the memory 130 may be configured by a random access memory (RAM), a dynamic RAM (DRAM), a read only memory (ROM)), a flash memory, a volatile memory, a non-volatile memory, and/or a combination thereof.

Hereinafter, an implementation example of FIG. 26 will be described in detail with reference to the drawings.

Example of Handheld Device to Which Present Disclosure is Applied

Figure 27:
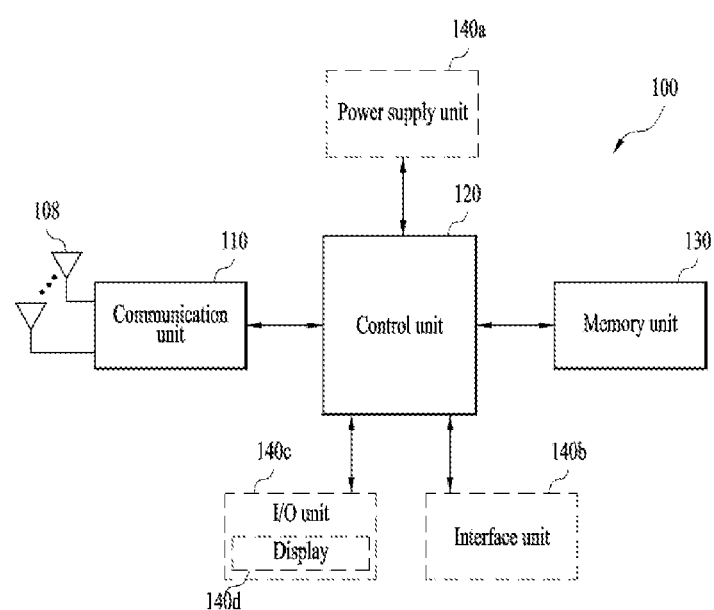
FIG. 27 illustrates a handheld device applied to the present disclosure.

FIG. 27 illustrates a handheld device applied to the present disclosure. The handheld device may include a smartphone, a smartpad, a wearable device (e.g., a smartwatch or smartglasses), or a portable computer (e.g., a notebook). The handheld device may be referred to as an MS, a UT, an MSS, an SS, an AMS, or a WT.

Referring to FIG. 27, a handheld device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 26, respectively.

The communication unit 110 may transmit and receive signals (e.g., data and control signals) to and from other wireless devices or BSs. The control unit 120 may perform various operations by controlling constituent elements of the handheld device 100. The control unit 120 may include an application processor (AP). The memory unit 130 may store data/parameters/programs/code/commands needed to drive the handheld device 100. The memory unit 130 may store input/output data/information. The power supply unit 140a may supply power to the handheld device 100 and include a wired/wireless charging circuit, a battery, etc. The interface unit 140b may support connection of the handheld device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may covert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 28:
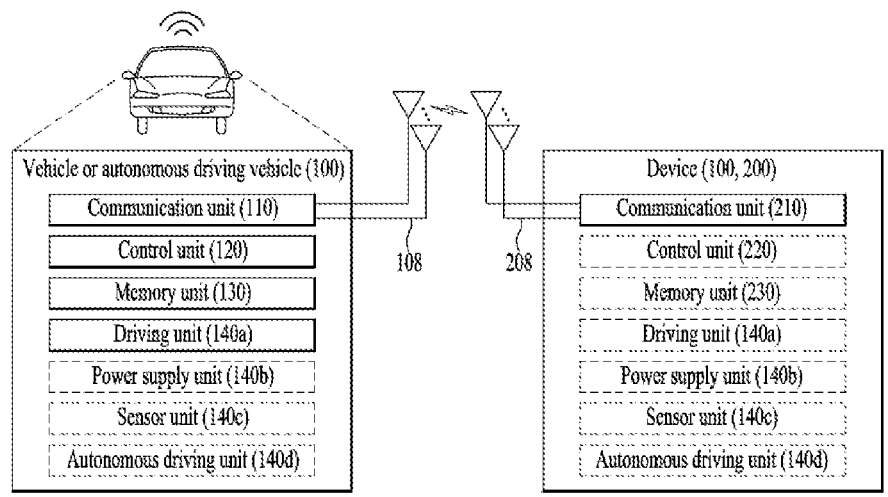
FIG. 28 illustrates a vehicle or an autonomous driving vehicle applied to the present disclosure.

Example of Vehicle or Self-Driving Vehicle to Which Present Disclosure is Applied FIG. 28 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 28, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110, 130, and 140a to 140d correspond to the blocks 110, 130, and 140 of FIG. 26, respectively.

The communication unit 110 may transmit and receive signals (e.g., data and control signals) to and from external devices such as other vehicles, BSs (e.g., RSUs), and servers. The control unit 120 may perform various operations by controlling elements of the vehicle or the autonomous driving vehicle 100. The control unit 120 may include an ECU. The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane in which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments are combinations of elements and features of the present disclosure in specific forms. The elements or features may be considered selective unless mentioned otherwise. Each element or feature may be implemented without being combined with other elements or features. Further, the embodiments of the present disclosure may be configured by combining some elements and/or some features. Operation orders described in the embodiments of the present disclosure may be rearranged. Some constructions or features of any one embodiment may be included in another embodiment or may be replaced with corresponding constructions or features of another embodiment. It is obvious that claims that are not explicitly cited in the appended claims may be presented in combination as an embodiment of the present disclosure or included as a new claim by subsequent amendment after the application is filed.

In the present disclosure, the embodiments of the present disclosure have been described mainly focusing on a signal transmission and reception relationship between a UE and a BS. Such as signal transmission and reception relationship may be equally or similarly extended even to signal transmission and reception between the UE and a relay or between the BS and the relay. In the present disclosure, a specific operation described as being performed by the BS may also be performed by an upper node of the BS. That is, it is apparent that, in a network consisting of a plurality of network nodes including the BS, various operations performed for communication with the UE may be performed by the BS, or network nodes other than the BS.

The embodiments of the present disclosure may be implemented by various means, for example, hardware, firmware, software, or a combination thereof. In a hardware configuration, the methods according to exemplary embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present disclosure may be implemented in the form of a module, a procedure, a function, etc. that perform the above-described functions or operations. Software code may be stored in a memory unit and be executed by a processor. The memory unit may be located at the interior or exterior of the processor and may transmit and receive data to and from the processor via various known means.

The present disclosure applies BF technology in an FDR communication system and may reduce the influence of SI and CLI without implementing an additional circuit at an Rx end.

It will be appreciated by persons skilled in the art that that the effects that are achievable through various embodiments are not limited to what has been particularly described hereinabove and other advantages not mentioned herein will be more clearly understood from the above detailed description.

The implementation examples of the present disclosure described above may be applied to various mobile communication systems.

Those skilled in the art will appreciate that the present disclosure may be embodied in other specific forms than those set forth herein without departing from the spirit and essential characteristics of the present disclosure. The above description is therefore to be construed in all aspects as illustrative and not restrictive. The scope of the present disclosure should be determined by reasonable interpretation of the appended claims and all changes coming within the equivalency range of the present disclosure are intended to be embraced in the scope of the present disclosure.

INDUSTRIAL APPLICABILITY

The above-described embodiments of the present disclosure are applicable to various mobile communication systems.

The invention claimed is:

1. A method of transmitting an Uplink (UL) Channel by a user equipment (UE) in a wireless communication system, the method comprising:
    receiving, from a base station (BS), first information related to (i) an UL Transmission (Tx) beam switching interval, and (ii) a number of UL Tx beam switching candidates;
    receiving, from the BS, a parameter related to a reference signal (RS) configuration;
    transmitting a RS based on (i) the parameter and (ii) a first UL Tx beam pattern which is determined, by the UE, based on the first information;
    transmitting, to the BS, second information related to a self-interference which is measured based on the RS;
    receiving, from the BS, third information related to a second UL Tx beam pattern which is determined, by the BS, based on the second information; and
    transmitting, to the BS, a UL channel based on the third information through a slot included in a frame,
    wherein the UL channel is a Physical Uplink Shared Channel (PUSCH),
    wherein the RS is a Demodulation Reference Signal (DMRS) for the PUSCH,
    wherein the slot includes 14 Orthogonal Frequency Division Multiplexing (OFDM) symbols,
    wherein a number of slots included in the frame is determined based on a Subcarrier Spacing (SCS) of the UL Channel,
    wherein, based on RS precoding being enabled, the RS is generated based on pseudo-noise (PN) sequence, and
    wherein, based on the RS precoding not being enabled, the RS is generated based on Zadoff-Chu (ZC) sequence having a length equal to or larger than 30.

2. The method according to claim 1, wherein the second UL Tx beam pattern is determined based on the second information and information related to cross-link interference (CLI) measured by another UE.

3. The method according to claim 2, wherein the UE and the other UE are included in a first group, and the first group includes mutually affecting UEs.

4. The method according to claim 2, wherein the UE supports full duplex radio (FDR) mode.

5. The method according to claim 4, wherein based on the other UE supporting only transmission mode, the second UL Tx beam pattern is determined based on best cancellation of the self-interference.

6. The method according to claim 4, wherein based on the other UE supporting only reception mode, the second UL Tx beam pattern is determined based on (i) performance of the UE and (ii) performance of the other UE.

7. The method according to claim 4, wherein based on the other UE supporting the FDR mode, the second UL Tx beam pattern is determined based on least degradation of performance of the other UE.

8. A user equipment (UE) for transmitting an Uplink (UL) Channel in a wireless communication system, the UE comprising:
    at least one transceiver;
    at least one processor; and
    at least one computer memory operably connected to the at least one processor and configured to store instructions executable by the at least one processor to perform operations comprising:
    receiving, through the at least one transceiver from a base station (BS), first information related to (i) an UL Transmission (Tx) beam switching interval, and (ii) a number of UL Tx beam switching candidates;
    receiving, through the at least one transceiver from the BS, a parameter related to a reference signal (RS) configuration;
    transmitting, through the at least one transceiver a RS based on (i) the parameter and (ii) a first UL Tx beam pattern which is determined, by the UE, based on the first information;
    transmitting, through the at least one transceiver to the BS, second information related to a self-interference which is measured based on the RS;
    receiving, through the at least one transceiver from the BS, third information related to a second UL Tx beam pattern which is determined, by the BS, based on the second information; and
    transmitting, through the at least one transceiver to the BS, a UL channel based on the third information through a slot included in a frame,
    wherein the UL channel is a Physical Uplink Shared Channel (PUSCH),
    wherein the RS is a Demodulation Reference Signal (DMRS) for the PUSCH, wherein the slot includes 14 Orthogonal Frequency Division Multiplexing (OFDM) symbols, wherein a number of slots included in the frame is determined based on a Subcarrier Spacing (SCS) of the UL Channel, wherein, based on RS precoding being enabled, the RS is generated based on pseudo-noise (PN) sequence, and wherein, based on the RS precoding not being enabled, the RS is generated based on Zadoff-Chu (ZC) sequence having a length equal to or larger than 30.

9. A method of receiving an Uplink (UL) Channel by a base station (BS) in a wireless communication system, the method comprising:

transmitting, to a user equipment (UE), first information related to (i) an UL Transmission (Tx) beam switching interval, and (ii) a number of UL Tx beam switching candidates;

transmitting, to the UE, a parameter related to a reference signal (RS) configuration;

receiving, from the UE, a RS based on (i) the parameter and (ii) a first UL Tx beam pattern which is determined, by the UE, based on the first information;

receiving, from the UE, second information related to a self-interference which is measured based on the RS;

transmitting, to the UE, third information related to a second UL Tx beam pattern which is determined, by the BS, based on the second information; and receiving, from the UE, a UL channel based on the third information through a slot included in a frame, wherein the UL channel is a Physical Uplink Shared Channel (PUSCH), wherein the RS is a Demodulation Reference Signal (DMRS) for the PUSCH, wherein the slot includes 14 Orthogonal Frequency Division Multiplexing (OFDM) symbols, wherein a number of slots included in the frame is determined based on a Subcarrier Spacing (SCS) of the UL Channel, wherein, based on RS precoding being enabled, the RS is generated based on pseudo-noise (PN) sequence, and wherein, based on the RS precoding not being enabled, the RS is generated based on Zadoff-Chu (ZC) sequence having a length equal to or larger than 30.

10. The method according to claim 9, wherein the second UL Tx beam pattern is determined based on the second information and information related to cross-link interference (CLI) measured by another UE.

11. A base station (BS) for receiving an Uplink (UL) Channel in a wireless communication system, the BS comprising:

at least one transceiver;

at least one processor; and at least one computer memory operably connected to the at least one processor and configured to store instructions executable by the at least one processor to perform operations comprising:

transmitting, through the at least one transceiver to a user equipment (UE), first information related to (i) an UL Transmission (Tx) beam switching interval, and (ii) a number of UL Tx beam switching candidates;

transmitting, through the at least one transceiver to the UE, a parameter related to a reference signal (RS) configuration;

receiving, through the at least one transceiver from the UE, a RS based on (i) the parameter and (ii) a first UL Tx beam pattern which is determined, by the UE, based on the first information;

receiving, through the at least one transceiver from the UE, second information related to a self-interference which is measured based on the RS;

transmitting, through the at least one transceiver to the UE, third information related to a second UL Tx beam pattern which is determined, by the BS, based on the second information; and receiving, through the at least one transceiver from the UE, a UL channel based on the third information through a slot included in a frame, wherein the UL channel is a Physical Uplink Shared Channel (PUSCH), wherein the RS is a Demodulation Reference Signal (DMRS) for the PUSCH, wherein the slot includes 14 Orthogonal Frequency Division Multiplexing (OFDM) symbols, wherein a number of slots included in the frame is determined based on a Subcarrier Spacing (SCS) of the UL Channel, wherein, based on RS precoding being enabled, the RS is generated based on pseudo-noise (PN) sequence, and wherein, based on the RS precoding not being enabled, the RS is generated based on Zadoff-Chu (ZC) sequence having a length equal to or larger than 30.

12. An apparatus for transmitting an Uplink (UL) Channel in a wireless communication system, the apparatus comprising:

at least one processor; and at least one computer memory operably connected to the at least one processor and configured to store instructions executable by the at least one processor to perform operations comprising:

receiving, from a base station (BS), first information related to (i) an UL Transmission (Tx) beam switching interval, and (ii) a number of UL Tx beam switching candidates;

receiving, from the BS, a parameter related to a reference signal (RS) configuration;

transmitting a RS based on (i) the parameter and (ii) a first UL Tx beam pattern which is determined, by the UE, based on the first information;

transmitting, to the BS, second information related to a self-interference which is measured based on the RS;

receiving, from the BS, third information related to a second UL Tx beam pattern which is determined, by the BS, based on the second information; and transmitting, to the BS, a UL channel based on the third information through a slot included in a frame, wherein the UL channel is a Physical Uplink Shared Channel (PUSCH), wherein the RS is a Demodulation Reference Signal (DMRS) for the PUSCH, wherein the slot includes 14 Orthogonal Frequency Division Multiplexing (OFDM) symbols, wherein a number of slots included in the frame is determined based on a Subcarrier Spacing (SCS) of the UL Channel, wherein, based on RS precoding being enabled, the RS is generated based on pseudo-noise (PN) sequence, and wherein, based on the RS precoding not being enabled, the RS is generated based on Zadoff-Chu (ZC) sequence having a length equal to or larger than 30.

13. A non-transitory computer-readable storage medium storing at least one computer program, the at least one computer program includes instructions that, when executed by at least one processor, cause the at least one processor to perform user equipment (UE) operations comprising:

receiving, from a base station (BS), first information related to (i) an UL Transmission (Tx) beam switching interval, and (ii) a number of UL Tx beam switching candidates;

receiving, from the BS, a parameter related to a reference signal (RS) configuration;

transmitting a RS based on (i) the parameter and (ii) a first UL Tx beam pattern which is determined, by the UE, based on the first information;

transmitting, to the BS, second information related to a self-interference which is measured based on the RS;

receiving, from the BS, third information related to a second UL Tx beam pattern which is determined, by the BS, based on the second information; and transmitting, to the BS, a UL channel based on the third information through a slot included in a frame, wherein the UL channel is a Physical Uplink Shared Channel (PUSCH), wherein the RS is a Demodulation Reference Signal (DMRS) for the PUSCH, wherein the slot includes 14 Orthogonal Frequency Division Multiplexing (OFDM) symbols, wherein a number of slots included in the frame is determined based on a Subcarrier Spacing (SCS) of the UL Channel, wherein, based on RS precoding being enabled, the RS is generated based on pseudo-noise (PN) sequence, and wherein, based on the RS precoding not being enabled, the RS is generated based on Zadoff-Chu (ZC) sequence having a length equal to or larger than 30.

* * * * *